US009911395B1

(12) United States Patent
Townsend et al.

(10) Patent No.: US 9,911,395 B1
(45) Date of Patent: Mar. 6, 2018

(54) GLARE CORRECTION VIA PIXEL PROCESSING

(71) Applicant: Amazon Technologies, Inc., Seattle, WA (US)

(72) Inventors: Matthew Alan Townsend, Redwood City, CA (US); Huma Dawood Khatri, Mountain View, CA (US); Gabrielle Halberg, Redwood City, CA (US); Bryan Harris, San Francisco, CA (US); Douglas Sim Dietrich, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 14/581,111

(22) Filed: Dec. 23, 2014

(51) Int. Cl.
*G09G 5/02* (2006.01)
*G09G 5/10* (2006.01)
*G06F 3/01* (2006.01)

(52) U.S. Cl.
CPC .............. *G09G 5/10* (2013.01); *G06F 3/012* (2013.01); *G09G 5/02* (2013.01); *G09G 2320/0233* (2013.01); *G09G 2320/0626* (2013.01); *G09G 2320/0666* (2013.01); *G09G 2354/00* (2013.01)

(58) Field of Classification Search
CPC ....... G06T 15/506; G06T 15/50; G06T 15/80; G06T 15/60; G06T 15/06; G06T 11/001; G09G 5/02; G09G 5/06; G09G 2320/0666; G09G 2340/06
See application file for complete search history.

(56) References Cited

U.S. PATENT DOCUMENTS

| | | | | |
|---|---|---|---|---|
| 5,704,024 A * | 12/1997 | Voorhies | ............... | G06T 15/506 345/426 |
| 5,854,661 A * | 12/1998 | Kochanski | ............... | G09G 5/00 345/102 |
| 6,034,691 A * | 3/2000 | Aono | ....................... | G06T 15/10 345/426 |
| 6,141,013 A * | 10/2000 | Nelson | .................. | G06T 15/005 345/426 |
| 6,416,476 B1 * | 7/2002 | Ogasawara | ............ | A61B 8/466 600/425 |
| 6,504,538 B1 * | 1/2003 | Freund | .................. | G06T 15/506 345/426 |
| 6,724,438 B2 * | 4/2004 | Lee | ......................... | G06T 5/009 348/587 |
| 6,999,080 B1 * | 2/2006 | Ungar | ................... | G06T 15/506 345/426 |
| 7,746,321 B2 * | 6/2010 | Banning | ................ | G03B 21/00 345/156 |
| 7,786,993 B2 * | 8/2010 | Cerny | ................... | G06T 15/506 345/419 |

(Continued)

*Primary Examiner* — Abderrahim Merouan
(74) *Attorney, Agent, or Firm* — Pierce Atwood LLP

(57) ABSTRACT

A system and method for generating a corrected input to a display to offset glare is provided. The system determines a location of a user's head and calculates a reflection vector based on a head vector from a device to a point on the user's head. The system identifies light sources using a camera and determines display pixels on a display of the device affected by the reflection of the light sources based on head detection and locations of the light sources. The system dynamically adjusts pixel brightness to account for a detected glare, thus improving the user's experience operating the UI.

20 Claims, 27 Drawing Sheets

(56) References Cited

U.S. PATENT DOCUMENTS

| | | | | |
|---|---|---|---|---|
| 7,948,485 B1* | 5/2011 | Larsen | | G06T 13/60 |
| | | | | 345/419 |
| 8,885,877 B2* | 11/2014 | Publicover | | G06K 9/00604 |
| | | | | 382/103 |
| 9,035,944 B2* | 5/2015 | Werline | | G06T 19/20 |
| | | | | 345/419 |
| 9,285,897 B2* | 3/2016 | Banning | | G06F 3/0346 |
| 2004/0070565 A1* | 4/2004 | Nayar | | G06K 9/4661 |
| | | | | 345/156 |
| 2005/0088452 A1* | 4/2005 | Hanggie | | G06F 3/0481 |
| | | | | 345/581 |
| 2006/0284841 A1* | 12/2006 | Hong | | G06F 3/0325 |
| | | | | 345/157 |
| 2008/0018648 A1* | 1/2008 | Sun | | G06T 9/00 |
| | | | | 345/427 |
| 2009/0109240 A1* | 4/2009 | Englert | | G06T 19/006 |
| | | | | 345/633 |
| 2011/0006978 A1* | 1/2011 | Yuan | | G06F 3/013 |
| | | | | 345/156 |
| 2011/0007333 A1* | 1/2011 | Ishii | | H04N 1/6033 |
| | | | | 358/1.9 |
| 2011/0248987 A1* | 10/2011 | Mitchell | | G06T 15/20 |
| | | | | 345/419 |
| 2012/0032958 A1* | 2/2012 | Werline | | G06T 19/20 |
| | | | | 345/420 |
| 2012/0032973 A1* | 2/2012 | Sano | | G01J 3/504 |
| | | | | 345/593 |
| 2012/0218423 A1* | 8/2012 | Smith | | G06Q 30/02 |
| | | | | 348/207.1 |
| 2012/0314899 A1* | 12/2012 | Cohen | | G06F 3/04815 |
| | | | | 382/103 |
| 2013/0100097 A1* | 4/2013 | Martin | | G01J 1/4204 |
| | | | | 345/207 |
| 2013/0154811 A1* | 6/2013 | Ferren | | G06K 9/3266 |
| | | | | 340/12.5 |
| 2014/0293341 A1* | 10/2014 | Yasutomi | | H04N 1/6097 |
| | | | | 358/1.15 |
| 2015/0077323 A1* | 3/2015 | Ramaswamy | | G06F 3/012 |
| | | | | 345/156 |
| 2015/0193664 A1* | 7/2015 | Marti | | G06K 9/00845 |
| | | | | 382/103 |
| 2015/0226840 A1* | 8/2015 | Becker | | G01S 17/42 |
| | | | | 356/5.01 |
| 2015/0235629 A1* | 8/2015 | Large | | G09G 5/373 |
| | | | | 345/8 |

* cited by examiner

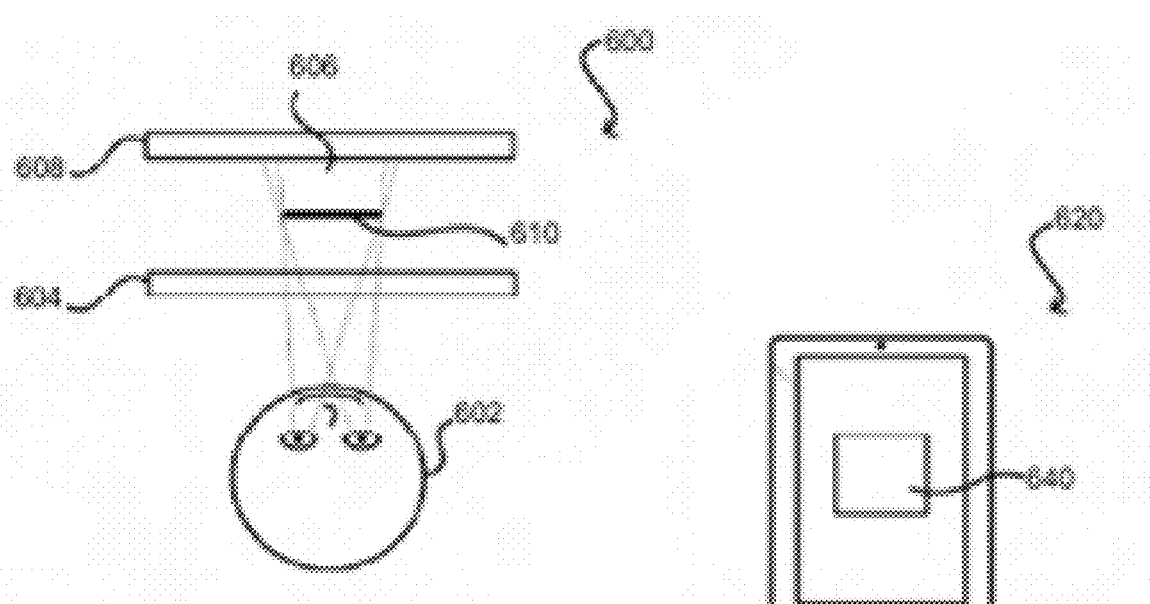
FIG. 6A
FIG. 6B
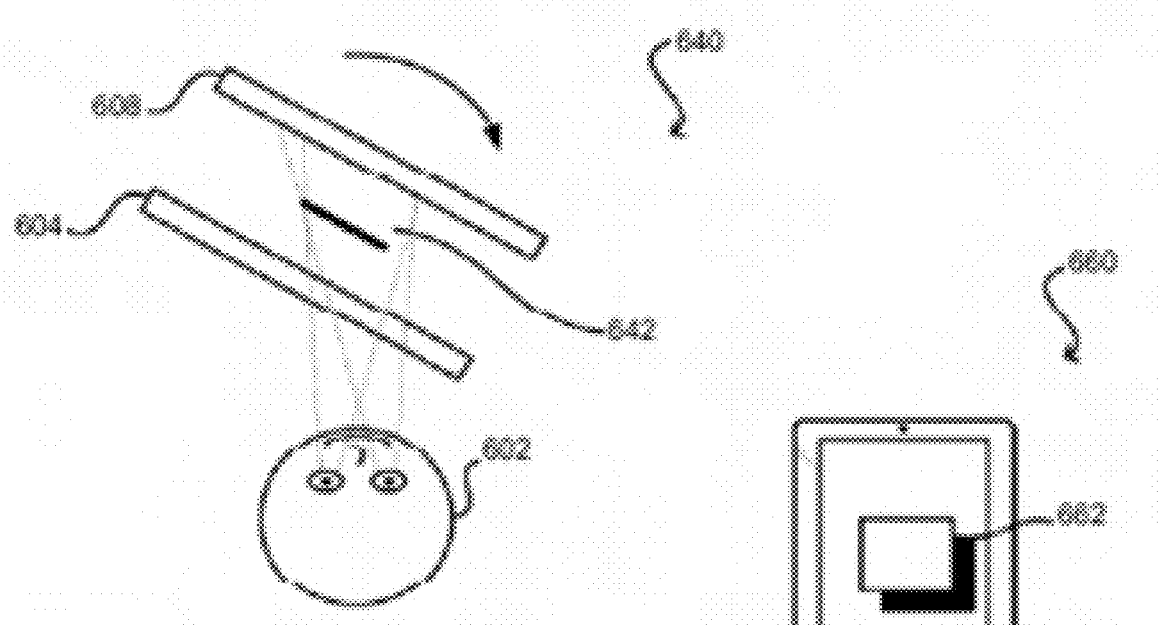
FIG. 6C
FIG. 6D $\theta_2/\theta_1$ depends on index of refraction Camera 1306-1
Camera 1306-2
Camera 1306-3
Camera 1306-4
104
108

View 1320

View 1322-1

View 1322-2

View 1322-3

View 1322-4

Capture 1324-1

Capture 1324-2

Capture 1324-3

Capture 1324-4

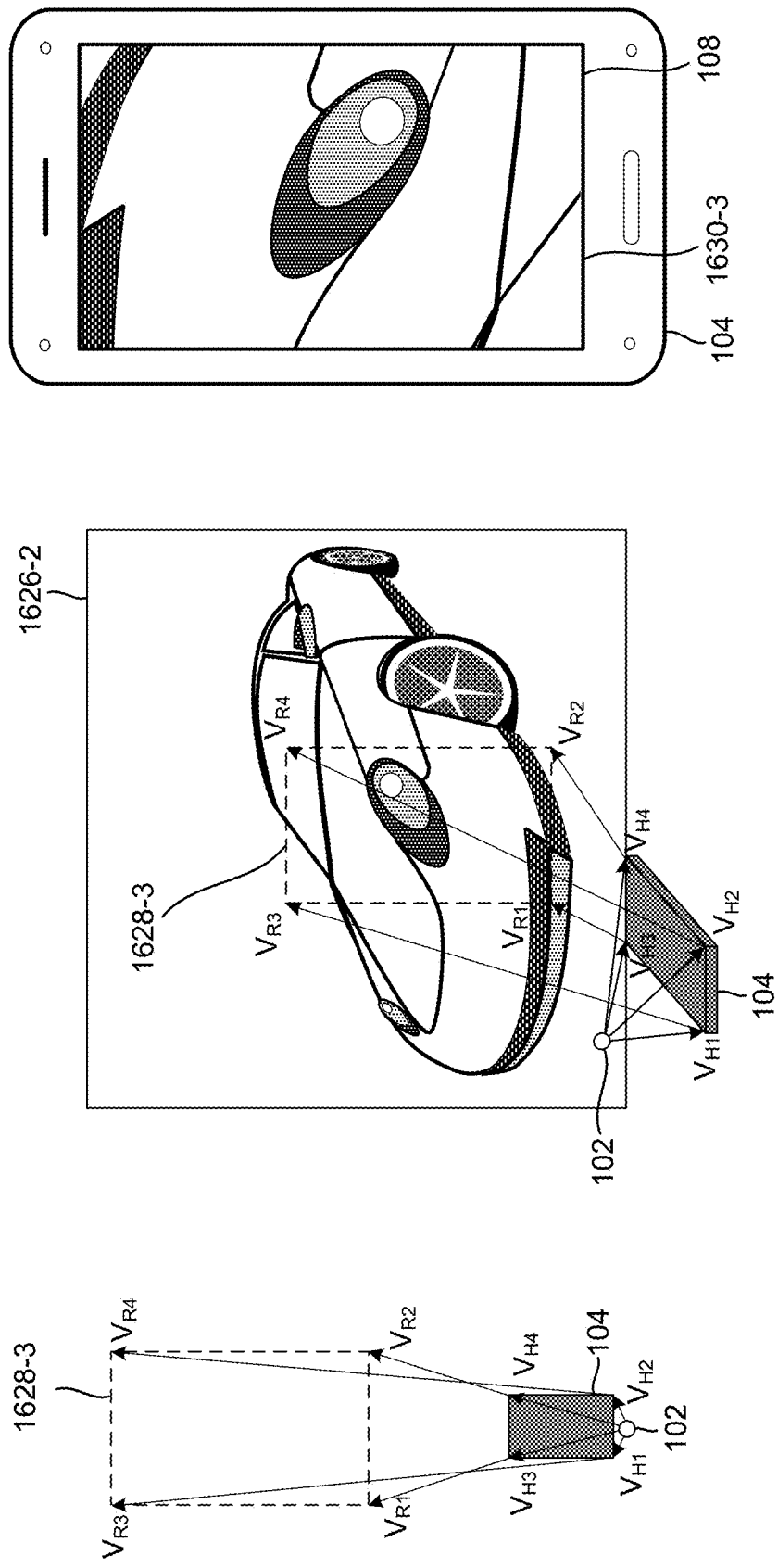

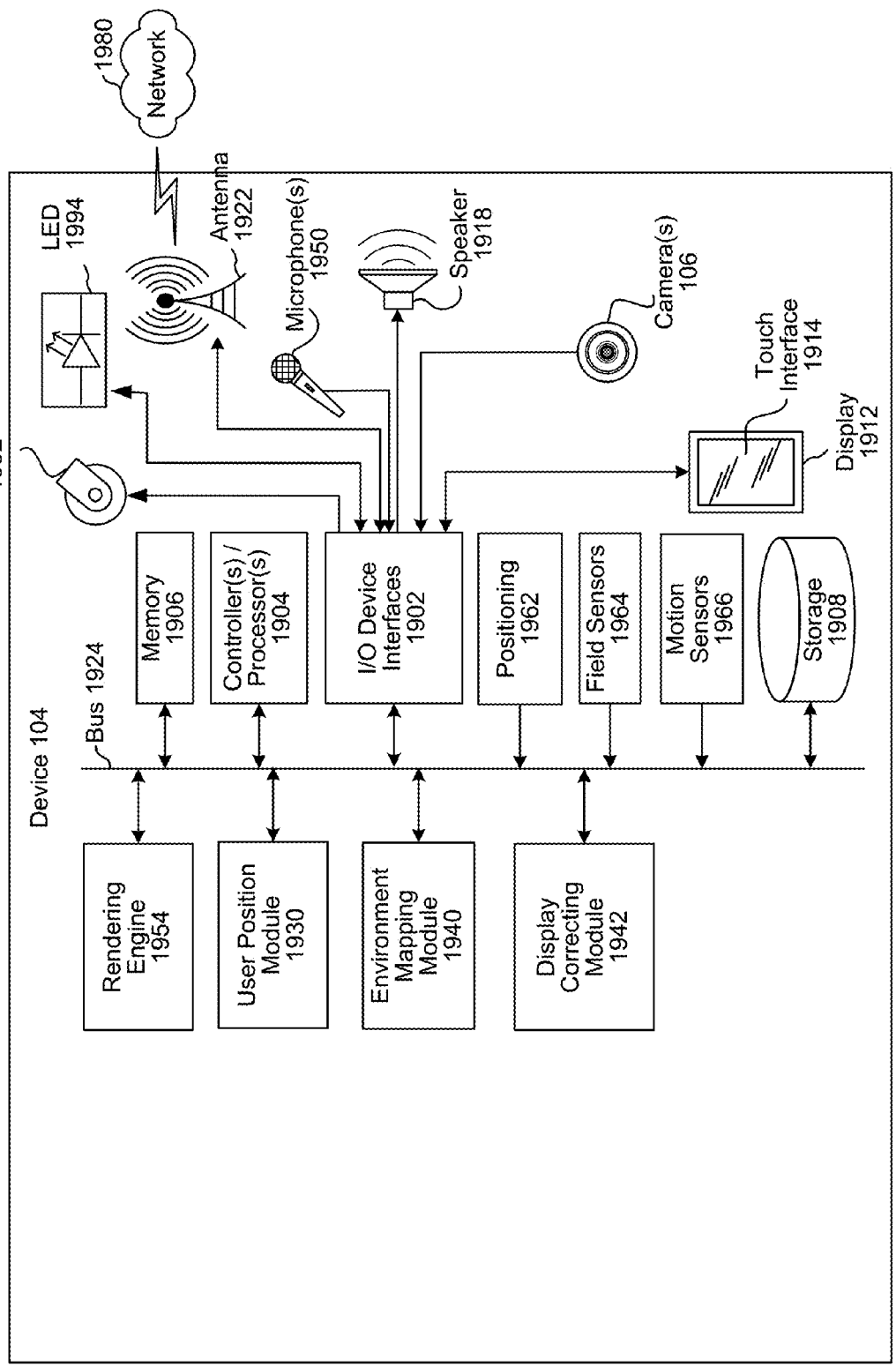

GLARE CORRECTION VIA PIXEL PROCESSING

BACKGROUND

Handheld electronic devices regular include navigation capability and often include features to determine device orientation or other internal sensors. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

FIGS. 6A-6D illustrate example approaches to determining changes in the relative viewing angle for a user in accordance with various embodiments.

FIGS. 16A-16E illustrate a size of a reflection region varying based on a length of the head vector in accordance with various embodiments.

FIG. 19 is an example block diagram conceptually illustrating example components of a device in accordance with various embodiments.

DETAILED DESCRIPTION

Certain computing devices may be configured with position based user interfaces. Such position based user interfaces may alter their appearance based on a user position relative to the device operating the user interface (UI). Such devices may determine relative user position using a number of techniques, include head detection. If a user's head is detected directly in front a device, graphical elements of the UI (such as icons, images, etc.) may display normally (as in a head on view). When a user's head is detected askew from the device, for example to the left or right by some amount, the UI may alter its display to show graphical elements or other content of the UI as if from an angle. In this manner the UI may create certain visual effects such as three dimensional (3D) effects, parallax, depth of UI graphical elements, or other effects.

When the user views a display of the device, light sources may reflect off of the display, creating glare and washing out a portion of the display. When the visual effects of the UI are static, the user may modify a position of the user's head relative to the display to reduce an amount of glare present on the display without altering the UI. When the visual effects of the UI change based on the position of the user's head relative to the device, however, glare may be difficult to avoid as the user's head moves relative to the display because the UI will change as well. Thus portions of the UI on the display may continue to be washed out as the user's head moves. To reduce the glare without modifying a position of the user's head relative to the display, the device may dim pixels on the display affected by the glare. For example, the device may track light sources using a camera and determine pixels affected by the reflection of the light sources based on the head detection and locations of the light sources. Thus a device may dynamically adjust pixel brightness to account for a detected glare, thus improving the user's experience operating the UI.

As used herein, image data may refer to data representing an image and image information may refer to identifiable features and/or shapes visible within the image. For example, a device may capture first image data that represents a first image and the first image may include image information such as a face or an object. For ease of explanation, the disclosure may reference image information with regard to visible characteristics within an image and may combine image information to generate an additional image, such as a stitched image or a combined image. While the disclosure may refer to the image information, the image information corresponds to image data that is processed by the device.

Figure 1A:
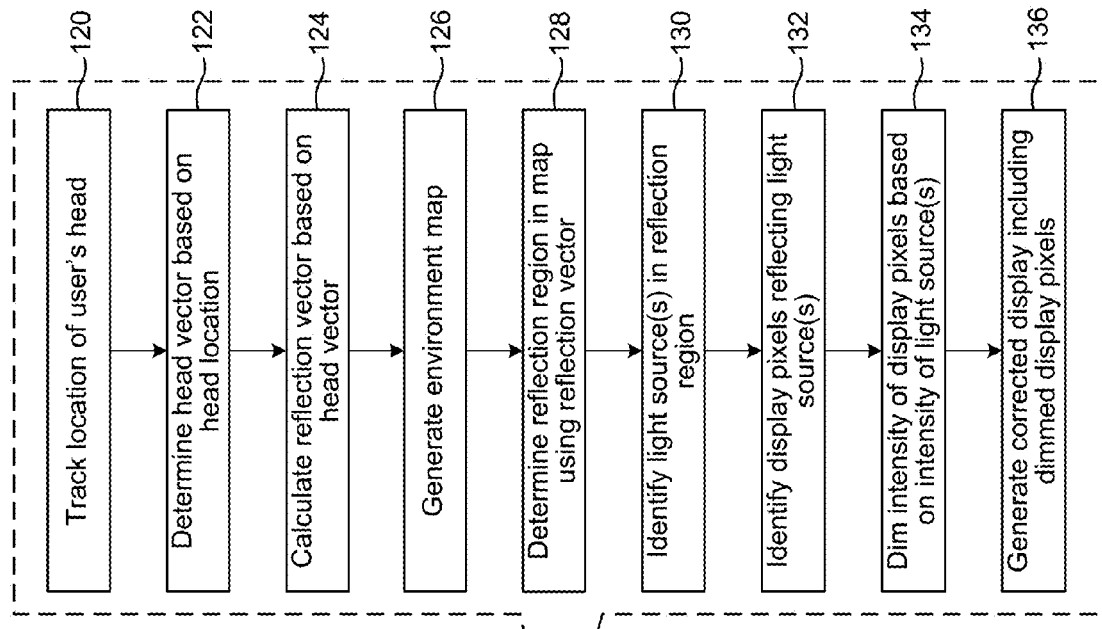
FIGS. 1A-1I illustrate an example approach for detecting and tracking a user in relation to a device and generating a corrected display on the device in accordance with an embodiment.
Figure 1A:
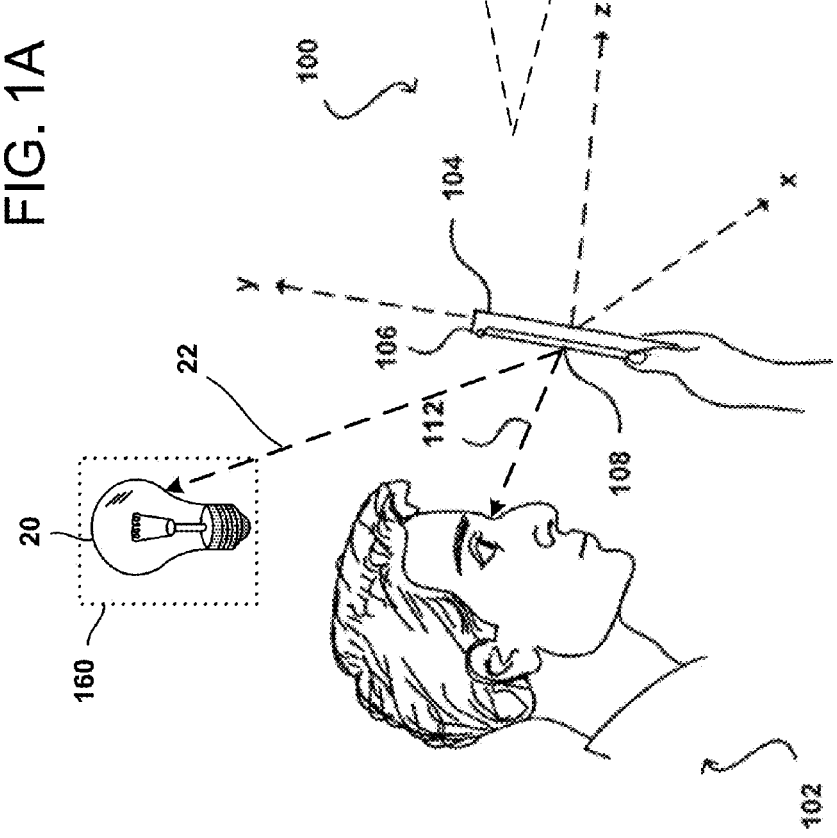

FIG. 1A shows a situation 100 of a user 102 viewing a screen 108 of a device 104. The device may be equipped with one or more cameras 106 that can detect the user's position relative to the device 104, illustrated by head vector 112 (described further below). As shown, X, Y, and Z axes may be defined where the device 104 can detect rotation of the device 104 about one or more of the axes. A light source 20 may reflect off of the display 108 and be visible to the user 102, resulting in glare on the device 104. To determine that glare is visible on the display 108, the device 104 may determine a region that is reflected by the display 108 by calculating a reflection vector 22 using the head vector 112. This region may be referred to as the reflection region, which is the region in the device's environment that is reflected by the display. For example, the reflection region 160 in FIG. 1A is illustrated by the dotted lines. The device 104 may identify the light source 20 in the reflection region 160 and may generate a corrected display to negate the glare caused by the light source 20.

The device 104 may track (120) a location of a user's head. The device 104 may determine (122) a head vector 112 based on the location of the user's head. The head vector 112 may be between a center of the device 104 to a point on the user's head, such as between the user's eyes. The device 104 may calculate (124) a reflection vector 22 based on the head vector 112. The reflection vector 22 may originate between the center of the device 104 and extend to the reflection region 160, and in particular to whatever is visible to the user 102 as a reflection on the display 108, such as the light source 20.

The device 104 may generate (126) an environment map of an area surrounding the device 104. For example, the device 104 may capture image data representing image(s) of the surrounding area and generate a cubemap. The device 104 may determine (128) a reflection region in the environment map using the reflection vector. For example, the device 104 may use the reflection vector to sample an area of the cubemap and acquire a reflection region 160 from the captured image(s). The device 104 may identify (130) light source(s) in the reflection region. For example, the device 104 may identify image pixels in the reflection region having a brightness intensity value (hereinafter, "intensity") above a threshold and group the image pixels together as light source(s).

The device 104 may identify (132) display pixels on the display 108 reflecting the light source(s). For example, the device 104 may correlate the reflection region to the display 108 and identify a reflection location on the display, the reflection location including display pixels corresponding to the light source(s) in the reflection region. The device 104 may dim (134) intensities of the identified display pixels based on intensities of the corresponding light source(s). For example, the device 104 may determine an average intensity of image pixels associated with a light source and dim an intensity of a display pixel corresponding to the light source based on the average intensity. Alternatively, the device 104 may dim individual display pixels based on an intensity of individual image pixels associated with the light source. The device 104 may generate (136) a corrected display including the dimmed display pixels. The corrected display may include first display pixels unaffected by reflections of the light source(s) at normal intensities and may include second display pixels affected by reflections of the light source(s) at dimmed intensities. The light source(s) may reflect off of the display 108 and the reflections may be additive to the dimmed intensities such that the user 102 sees the first display pixels and the second display pixels at similar intensities. Various other functions and advantages are described and suggested below in accordance with the various embodiments.

Various embodiments involve determining a position of a user with respect to a device, such as by analyzing image data utilizing a user detection process, and tracking the user by combining the results of one or more tracking processes and/or other motion detection processes, such as determined by inertial sensors (e.g., accelerometer, gyroscope, inclinometer, and/or magnetometer). As there are not necessarily any dependencies between image-based tracking and inertial sensor-based motion detection, the two approaches can be complementary. The failure of one approach may not result in failure of the entire tracking system. For instance, image-based tracking can be computationally costly and may incur an undesirable amount of latency. Inertial sensor-based motion detection, on the other hand, has relatively lower latency but can be subject to drift over time. By combining image-based tracking and inertial sensor-based motion detection, the tracking system in the aggregate may not be subject to deficiencies of conventional approaches that use one particular approach alone.

In some embodiments, one detection and/or tracking process can be used as a primary or predominant approach and the other technique(s) may be used as the secondary detection and/or tracking approach(es) to the extent the primary or predominant approach fails to detect and/or track the user. For example, the secondary detection and/or tracking approach(es) may be executed only if the probability, confidence level, error rate, or other such metric corresponding to the estimated position of the user as determined by the primary detection and/or tracking approach is below a threshold value. As another example, one particular detection and/or tracking process may be highly accurate but computationally expensive and a second detection and/or tracking process may be less processor-intensive but less accurate from a "cold start" yet highly effective when the initial user position is known. The device can be configured to use the first detection and/or tracking process to detect the user and track the user using the second detection and/or tracking process thereafter.

In some embodiments, input data from inertial sensors or other input devices can be used to optimize an object tracking system. For example, device motion data captured by one or more inertial sensors can be used as a cue for where to begin detecting and/or tracking of the user in image data or to limit regions of the image data for detecting and/or tracking the user. As another example, a device may be equipped with an ambient light sensor that can capture the amount of ambient light in the environment in which the device is being used. Certain detection and/or tracking processes may be more sensitive to illumination conditions than others, and such processes may be selected (or not selected) for detecting and tracking a user and/or such processes can be weighted based on the determined amount of ambient light.

In some embodiments, multiple image-based user detection and/or tracking processes can be executed simultaneously, other motion determination techniques can be performed, and/or other sensor data analyzed for detecting and tracking a user. The data obtained by these independent processes can be aggregated for more robustly detecting and tracking a user. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6 DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of user position and/or orientation from the camera(s) of the device, probability estimates of device position and/or orientation from the inertial sensor(s) of the device, and/or other probability estimates. The probabilistic system can define the position and/or orientation of the user with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

FIGS. 1A-1I illustrate an example approach of detecting and tracking a user in accordance with an embodiment. Returning to the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors, or other types of motion/orientation determination elements, such as accelerometers, gyroscopes, magnetometers, inclinometers, proximity sensors, distance sensors, depth sensors, range finders, ultrasonic transceivers, among others.

In this example, a head vector 112 is shown from a point at the center of the display screen 108 to a point on the head of the user 102, such as between the user's eyes. Head vector 112 is a three-dimensional vector that can be initially determined, for example, using a facial detection process performed on the image(s) captured by the camera(s) 106. In other embodiments, the vector can be determined using sensors or other input devices of a computing system, such as inertial sensors or proximity sensors. In at least some embodiments, head vector 112 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, triangles, cylinders, ellipsoids), contours (e.g., edges comprising the boundaries of the user's head or face), silhouettes (e.g., regions within the contours of the user's head or face), etc.

Figure 1C:
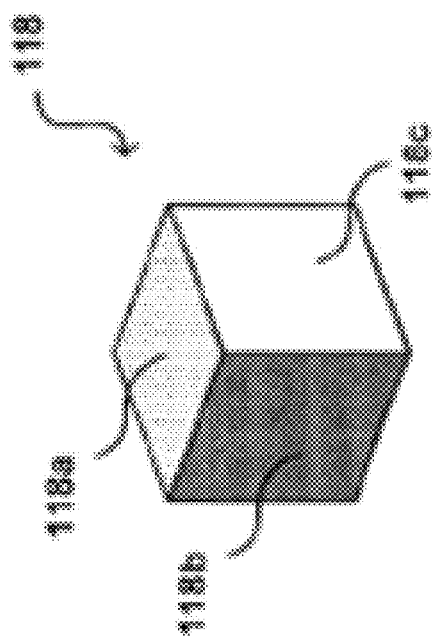
Figure 1B:
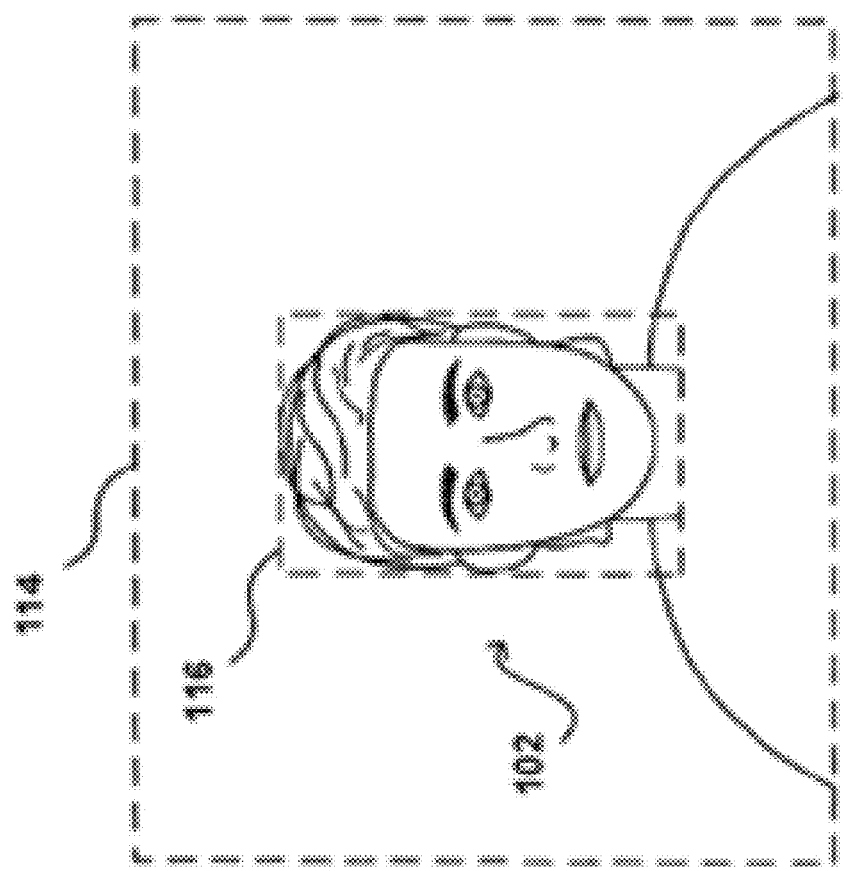

As illustrated in FIG. 1B, when the user 102 positions the computing device 104 directly in front of himself and gazes towards the display screen 108 straight on (i.e., the x-y plane of the device is parallel or substantially parallel to the user, where the lateral axis corresponds to the x-axis, the longitudinal axis corresponds to the y-axis, and the depth of the device or vertical axis corresponds to the z-axis), the image data captured by the camera 106 of the device can encompass the image 114. Although one image is shown to be captured in this instance, it will be appreciated that multiple images captured by a same camera at different times, multiple images captured by multiple cameras at a same time, or some combination thereof can be analyzed in various embodiments. Further, other embodiments may use other approaches, such as proximity sensors, to detect an object of interest with respect to a computing device. In this example, a user detection process is adapted for locating the head or face of a person. Here, the user detection process locates the head or face of the user 102 within the image 114 and provides as output the dimensions of a bounded box 116 indicating where the head or the face of the user is located in the image. In this example, the device is capable of rendering one or more three-dimensional graphical elements for display on the two-dimensional display screen 108 according to a first view or perspective of the user with respect to the display screen. The device relies on the pose of the head or face of the user with respect to the device and/or apparent motion of the user's head or face with respect to the device, as defined by head vector 112, to render an appropriate perspective of a 3-D object as 2-D image data as illustrated in FIG. 1C, here, a cube 118 with a top surface 118a, a left front-facing surface 118b, and right front-facing surface 118c. The front-facing surfaces 118b and 118c appear to be equal in scale when the user gazes upon the display screen 108 straight on.

Figure 1D:
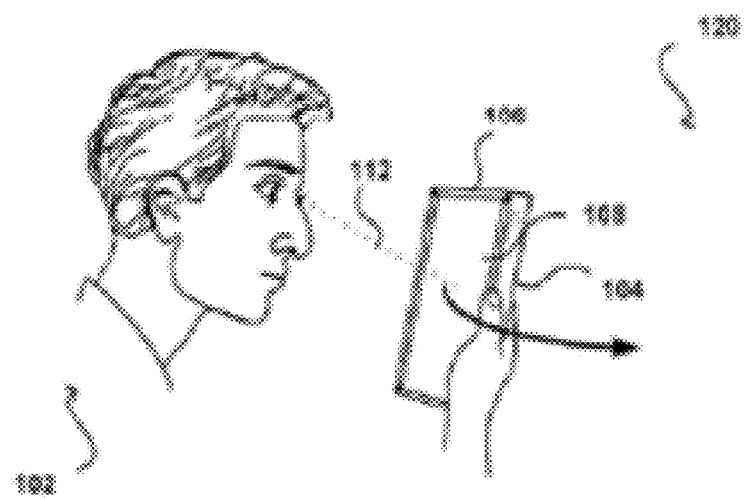
Figure 1E:
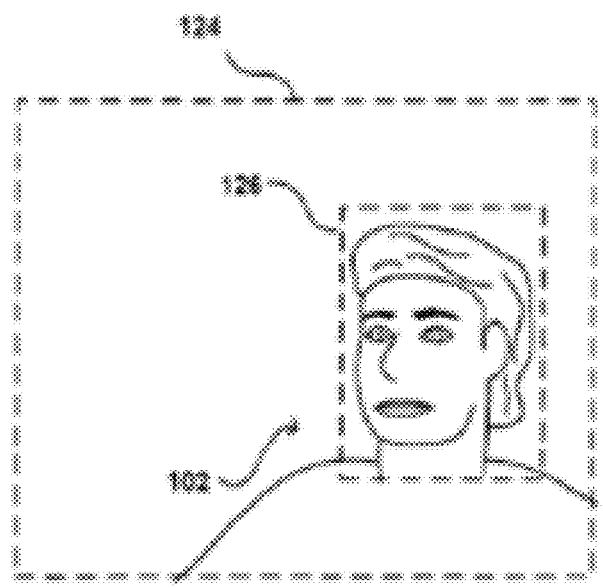
Figure 1F:
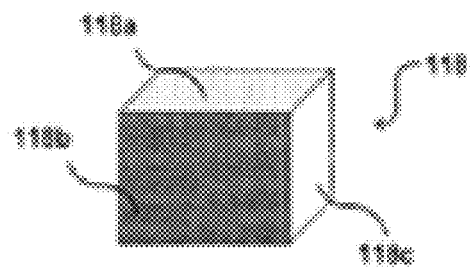

In FIG. 1D, an example situation 120 illustrates that the user 102 has tilted the computing device 104 to the right with respect to the perspective of the user, i.e., the user has rotated the device to his right about the longitudinal or y-axis, to obtain a second view or perspective of the 3-D object 118 depicted in FIG. 1F. As seen in FIG. 1E, the tilt or rotation of the device causes the camera 106 to capture a different view or perspective of the user within image 124, here, a three-quarters profile of the head or face of the user facing leftward. The position of the user's face may also be shifted towards a right region of the image because of the tilt or rotation of the device. In this example, the apparent motion of the face or head of the user (which is primarily due to the motion of the device) is tracked from the initial position detected in FIG. 1B to the new position depicted in FIG. 1E. For instance, the 3-D head vector 112 between the point between the user's eyes and the center of the front face of the device is recalculated based on the new position and orientation of the user with respect to the computing device. Based on the apparent movement of the user's head or face, the 3-D object 118 is re-rendered for display on the display screen 108 to correspond to the new perspective of the user 102. For example, as the user tilts the device rightward, the device will render and/or animate the 3-D cube 118 such that the left front-facing surface 118b of the cube appears more prominently on the display screen and the right front-facing surface 118c appears at a more oblique angle.

Figure 1G:
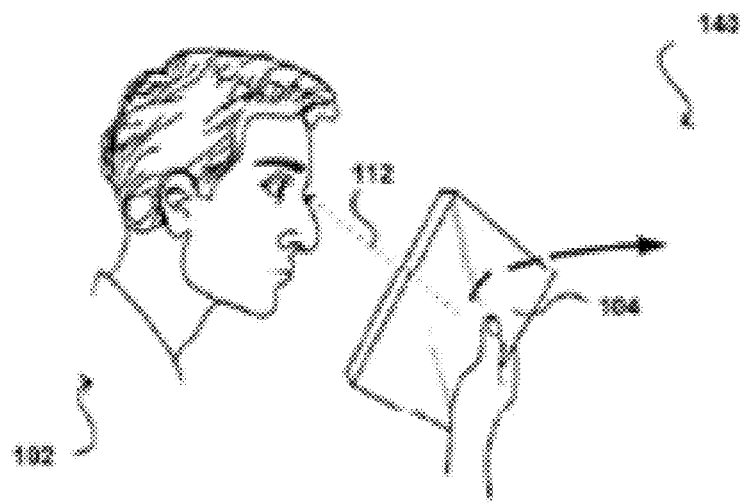
Figure 1H:
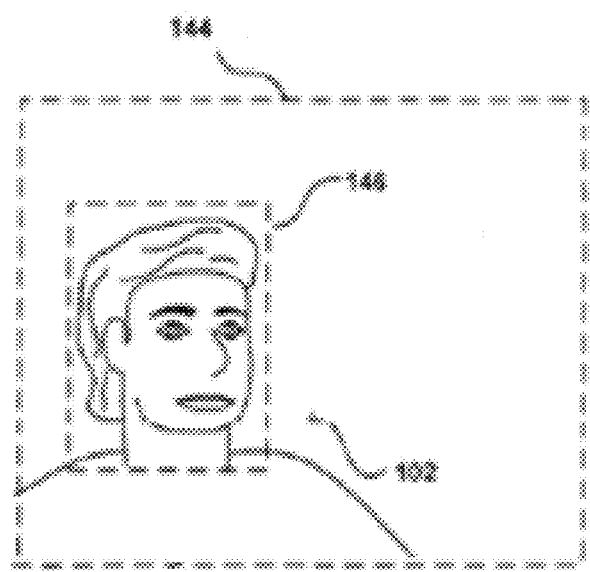
Figure 1I:
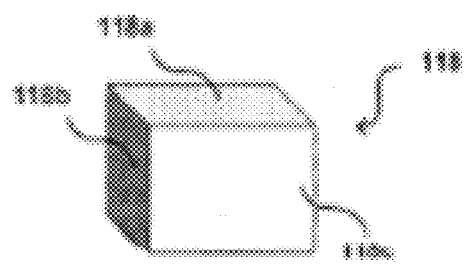

In FIG. 1G, an example situation 140 illustrates that the user 102 has tilted the computing device 104 to the left with respect to the perspective of the user, i.e., the user has rotated the device to his left about the longitudinal or y-axis, to obtain a third view or perspective of the 3-D object 118. As seen in FIG. 1H, the tilt or rotation of the device causes the camera 106 to capture a three-quarters profile of the head or face of the user facing rightward, and the position of the user's face has also shifted towards a left region of the image. In this example, the apparent movement of the face or head of the user (which, again, is primarily due to the motion of the device) is tracked from a previous position to the new position depicted in FIG. 1H. The 3-D object 118 can be re-rendered for display on the display screen 108 based on the apparent motion of the user's head or face. For example, as the user tilts the device towards his left from the position depicted in FIG. 1D, the box will transition or be animated from the perspective seen in FIG. 1F to the perspective seen in FIG. 1C when the x-y plane of the device is parallel or substantially parallel to the user. As the user continues rotating the device towards his left, the 3-D cube 118 will transition or be animated from the perspective seen in FIG. 1C to the perspective seen in FIG. 1I wherein the right front-facing surface 118c of the cube 118 appears more prominently on the display screen and the left front-facing surface 118b appears at a more oblique angle. When the user tilts the device forward (i.e., rotating the device about the x-axis such that the top portion of front of the device is further away from the user and the bottom portion of the front of the device is closer to the user), details of a bottom surface (not shown) of 3-D cube 118 may be displayed and the top surface 118a may be hidden. Likewise, tiling the device backwards (i.e., rotating the device about the x-axis such that the top portion of the front of the device is closer to the user and the bottom portion of the front of the device is farther from the user), will cause the top surface 118a to be displayed more prominently. It will be appreciated that objects, such as the head or face of the user, can generally be tracked according to six degrees of freedom (e.g., motion along the x-, y-, and z-axes or forward/backward, up/down, and left/right, and rotation about the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 118a and left front-facing surface 118b of the cube may be displayed more prominently and the right front-facing surface 118c may be appear at a more oblique angle and the bottom surface may remain hidden. When the user tilts the device forward and towards his left (i.e., such that the bottom right corner of the device is the closest point of the device to the user), the bottom surface and right front-facing surface 118c can be displayed with more details, and the top surface 118a and left front-facing surface 118b may appear more obscured or hidden.

As mentioned, in some embodiments, tracking of the vector (or other representation of a user) can be based on analyzing the change in position and/or orientation of the user between a first image, such as image 114 of FIG. 1B, and a second image, such as image 124 of FIG. 1E. For example, one or more cameras of a device can be calibrated in order to recover 3-D quantitative measures about an object of interest represented in 2-D images captured by the camera(s), such as a distance of the object of interest from the device, the height of the object of interest, etc. Various approaches can be used for camera calibration, such as direct linear transformation (DLT); the algorithm set forth in Tsai, Roger, "A versatile camera calibration technique for high-accuracy 3D machine vision metrology using off-the-shelf TV cameras and lenses," Robotics and Automation, IEEE Journal of 3, no. 4 (1987): 323-344; and the algorithm set forth in Zhang, Zhengyou, "A flexible new technique for camera calibration," Pattern Analysis and Machine Intelligence, IEEE Transactions on 22, no. 11 (2000): 1330-1334, each of which are incorporated herein by reference.

In other embodiments, tracking of the vector can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of the vector between the user and the computing device.

In still other embodiments, a combination of image-based tracking and tracking by inertial sensors can be used to track an object of interest. As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but a user tilts his head, inertial sensors will indicate no change in position of the user with respect to the device. Image-based tracking, on the other hand, may be more likely to detect the motion of the user with respect to the device. As another example, a user may be operating a device in a moving vehicle. Inertial sensors may indicate that the device is moving according to the direction of the vehicle even though the user may remain stationary with respect to the device. Image-based tracking can be more reliable in determining the position of the user with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In certain situations, a user may remain stationary or a device will be moved such that movement of the user's face or head may be negligible relative to the motion of the device. In such situations, it may be preferable to use motion data detected by the inertial sensors of the device for tracking the position and orientation of the user after the user has initially been detected in image data. In some embodiments, a user's change in position can be determined primarily based on motion data detected by the device's inertial sensors. For example, in one embodiment, the motion data detected by the inertial sensors can be sampled at a rate of 100.0 ms to update the user's position with respect to the device, and image data can be sampled at a rate of every 5.0 s to ensure that the user's position as determined by the inertial sensors do not substantially drift from the user's actual position. An advantage of such an approach would be to reduce the amount of processing that may be required by image-based tracking and conserve the battery life of the computing device. In other cases, image-based tracking can be used as the predominant approach for tracking the position if the user with respect to the device, and motion detected by inertial sensors can be used as backup in the event image-based tracking fails. For instance, lighting may temporarily go out or the user may otherwise be temporarily occluded such that an image-based tracking process is unable to track the user. In such instances, motion data captured by inertial sensors can be used to extrapolate the position of the user until the tracking process is able to re-track the user or a user detection process is executed to reinitialize the user's position with respect to the device.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, an ambient light sensor can be used to improve performance a tracking system. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

Figure 2A:
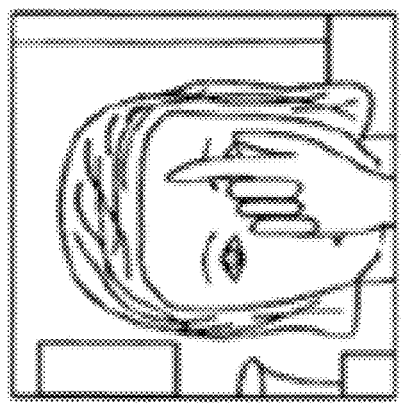
FIGS. 2A-2C illustrate stereoscopic image data that can be captured in accordance with various embodiments.
Figure 2B:
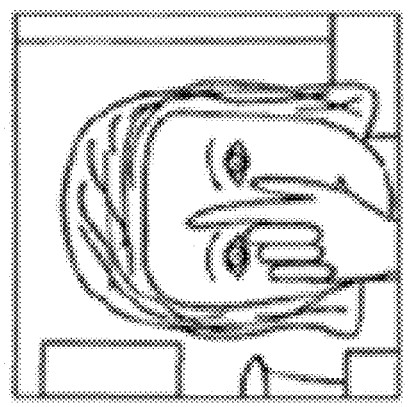
Figure 2C:
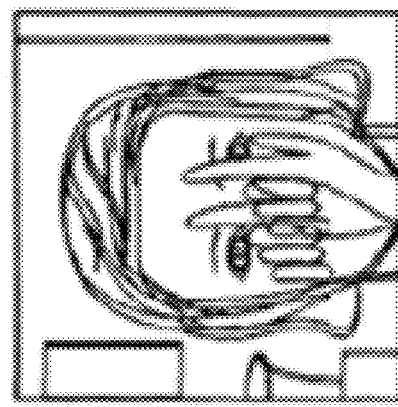

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions. FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the amount of disparity, or lateral offset, between objects in the images. Objects closer to the device, such as the finger, have relatively large amounts of disparity. Objects farther away from the device, such as a painting on the wall, have relatively small amounts of disparity. Objects between these two areas will have intermediate amounts of disparity based upon the relative distance of those objects from the cameras.

Figure 3:
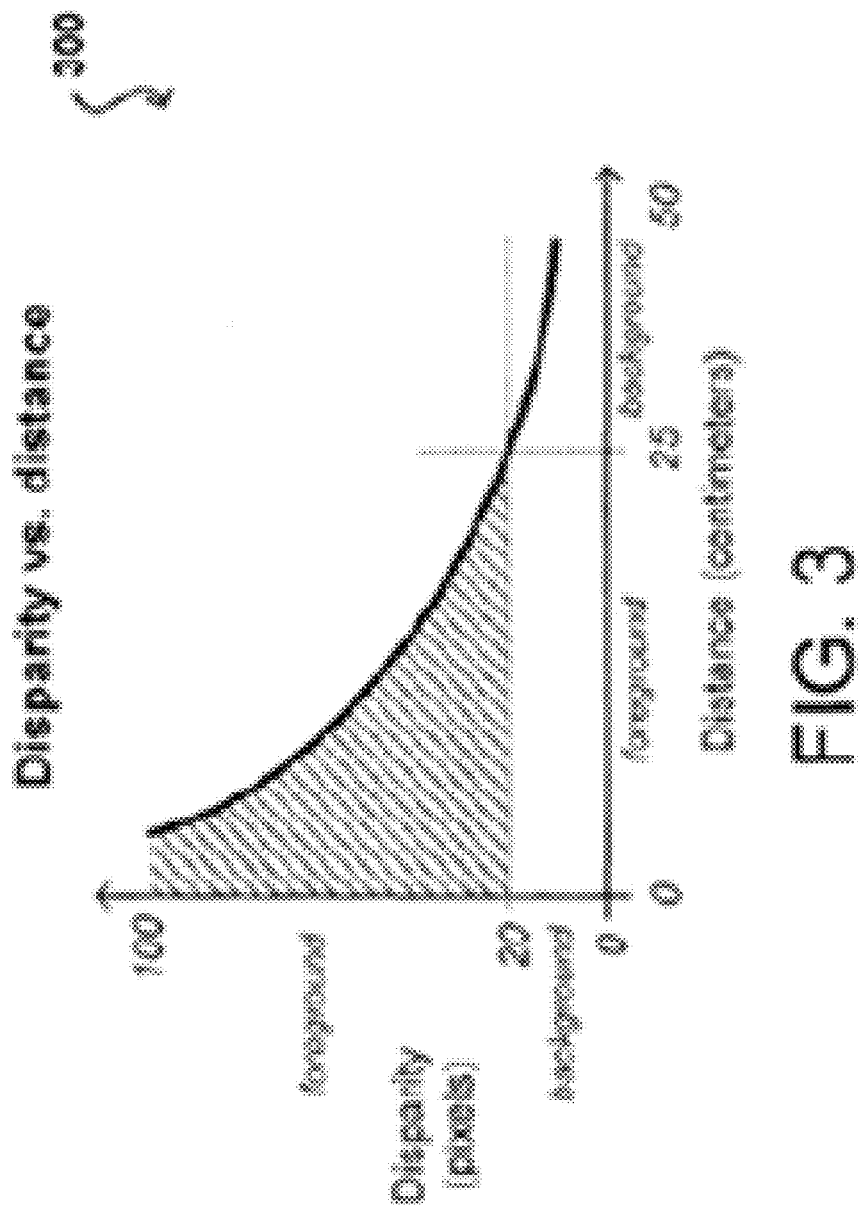
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f x B}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein.

In various embodiments, a user detection process is used to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes.

Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data. Such an approach is discussed in Huang, Gary B. et al. "Learning hierarchical representations for face verification with convolutional deep belief networks." In Computer Vision and Pattern Recognition (CVPR), 2012 IEEE Conference on, pp. 2518-2525. IEEE, 2012, which is incorporated herein by reference.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. The Viola-Jones detector is discussed in Viola, Paul et al. "Rapid object detection using a boosted cascade of simple features." In Computer Vision and Pattern Recognition, 2001. CVPR 2001. Proceedings of the 2001 IEEE Computer Society Conference on, vol. 1, pp. 1-511. IEEE, 2001, which is incorporated herein by reference.

Surveys of various approaches of user detection are discussed in Yang, Ming-Hsuan et al., "Detecting faces in images: A survey." Pattern Analysis and Machine Intelligence, IEEE Transactions on 24, no. 1 (2002): 34-58 and Hjelmås, Erik et al. "Face detection: A Survey." Computer Vision and Image Understanding 83, no. 3 (2001): 236-274, which are each incorporated herein by reference.

Figure 4A:
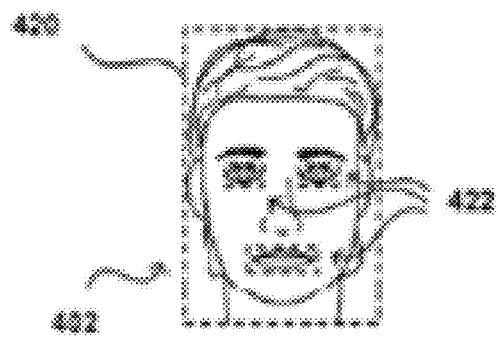
FIGS. 4A-4F illustrate examples of tracking a user in accordance various embodiments.

After at least a portion of a user has been detected in image data captured by a computing device, approaches in accordance with various embodiments track the detected portion of the user. FIGS. 4A-F illustrate certain approaches that can be utilized for detecting and tracking a user in accordance with various embodiments. FIG. 4A illustrates an example wherein the approximate position and orientation of the head of a user 402 has been determined and a virtual "box" 420 is placed around the user's head using one or more of the various user detection processes discussed herein. A similar or different approach can also be used to determine an approximate location and area 422 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 4B:

Various other approaches can also be used to track the user. For example, FIG. 4B illustrates an example wherein various features on a user's face are identified and assigned a point 424 in the image. The system thus can detect various aspects of user facial features and can determine changes such as movement or change in shape or expression. Such an approach can provide advantages over the general approach of FIG. 4A in certain situations, as various points along a facial feature can be determined, such as the end points and at least one center point of a user's mouth. Accordingly, expressions such as a smile or frown can be captured even though the overall position of the user's mouth or face did not move.

Figure 4C:
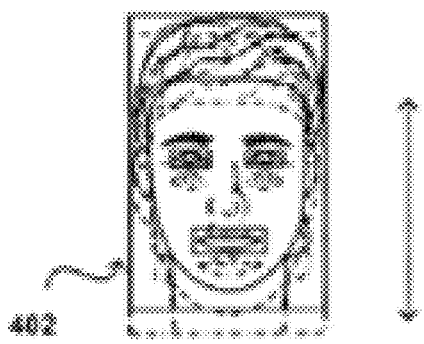
Figure 4D:
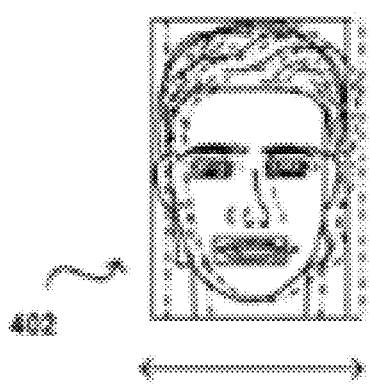
Figure 4E:
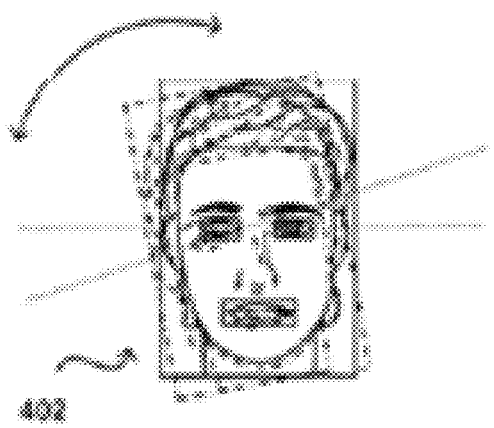

Once the facial features of a user are detected, relative motion or changes in facial expression can be tracked and utilized as input in accordance with various embodiments. For example, FIG. 4C illustrates an example where the user's head 402 is moving up and down with respect to the viewable area of the imaging element. As discussed, this could be the result of the user shaking his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 4E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 4F:

FIG. 4F illustrates another advantage of using an approach such as that described with respect to FIG. 4B to determine the position of various features on a user's face. In this example, it can be seen that the features of a head of a second user 403 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Figure 5A:
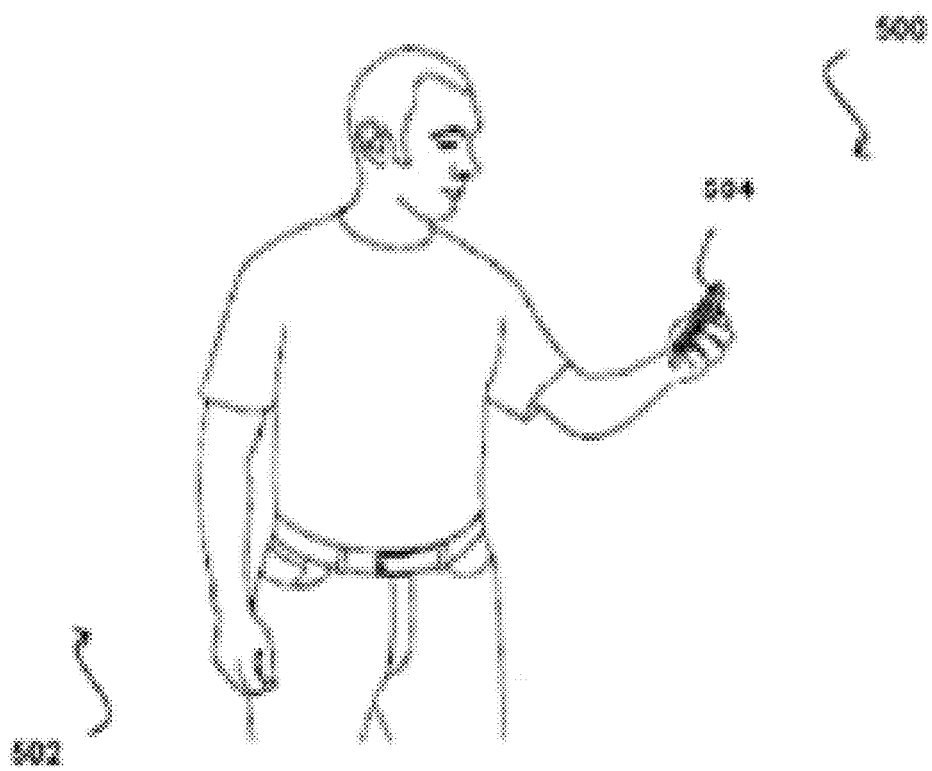
FIGS. 5A-5B illustrate example approaches for tracking a user in accordance with an embodiment.
Figure 5B:
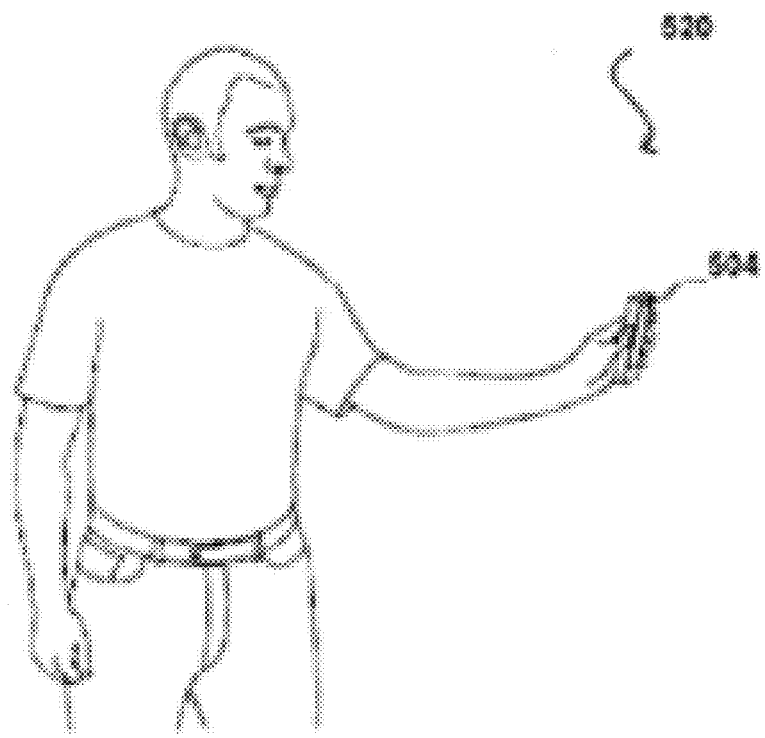

FIGS. 5A and 5B illustrate an example approach of using the motion of the computing device to supplement user detection and tracking in various embodiments. In FIG. 5A, the user 502 is holding a computing device 504, which in this example is shown to be a smartphone 504. The computing device may include one or more front-facing cameras that may capture images of the user's head, face, or other features and this image data may be analyzed for detecting and tracking a user as previously described. Because user detection and/or tracking typically can utilize a significant amount of resources, it may be useful for the computing device to leverage information about the motion of the device to enhance and supplement the user detection and/or tracking process. For example, it may be useful for the device to immediately detect (e.g., based on inertial sensor data) when the user has rotated or moved the device in such a way that the user would no longer be within the field of view of the front-facing camera(s). As shown in FIG. 5B, if the user turns the device around, the front-facing camera(s) would be facing away from the user and may have completely different objects within the field of view of the front-facing camera(s). One response to such detection may be for the computing device 504 to discontinue or suspend the user detection and/or tracking process rather than continue attempting to track the user. This may enable a more responsive user detection and/or tracking process.

Another example may be for the computing device to utilize the device motion information to continue the user detection and/or tracking process rather than discontinuing the process when the device is no longer detecting the user for short periods of time. For example, if the lighting conditions around the device are changing (e.g., when the user is on a moving train or bus), image data that can be analyzed may be captured when there is sufficient lighting and image data that cannot be analyzed may be captured when there is not enough lighting. Under such conditions, the device may analyze the motion information gathered by the sensors (e.g., accelerometer, gyroscope, light sensors, GPS receiver, etc.) and may determine that the computing device is likely located in a moving vehicle. Based on this determination, the computing device may elect to continue the user detection and/or tracking process uninterrupted (i.e., rather than repeatedly stopping and starting the process) based on the assumption that the user's face will soon once again become trackable due to the changing of the lighting conditions.

In some embodiments, user detection and tracking can be compensated, supplemented, or enhanced by motion estimation techniques that are based upon optical flow, such as block matching, differential methods, or phase correlation. Block matching is a correlation technique that searches for the best match between an image block of a current frame and a specified area of a previous frame. Differential techniques compute motion from spatial and temporal derivatives of image features such as intensities or filtered versions of the image. Differential methods include local methods and global methods. In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." In Proceedings of the 7th international joint conference on Artificial intelligence. 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." Artificial intelligence 17, no. 1 (1981): 185-203, which is incorporated herein by reference. Horn-Schunk uses a global regularization calculation as an additional constraint.

In some embodiments, phase correlation is used to determine inter-frame motion of an input video. Phase correlation is a frequency domain technique based on the shift property of the Fourier transform for measuring motion. To determine inter-frame motion using phase correlation, the cross power spectrum (CPS) of two frames is determined. If one frame is a shifted replica of the other, i.e., f2(x,y)=f1(x+x0, y+y0) then the phase of the cross power spectrum of the two frames f1 and f2 can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at (x0, y0), the required shift.

In various embodiments, a position and/or orientation of a user can be determined more robustly by combining results of an image-based user detection and/or tracking process with additional data, such as position estimates from one or more other image-based user detection and/or tracking processes or motion estimates from inertial sensors and/or other motion detection processes (e.g., optical flow). In at least some embodiments, a probabilistic system can be defined that models the physics of user motion, device motion, and imaging capturing by cameras of the device. The system can receive as inputs position/orientation estimates from one or more image-based detection and/or tracking processes, device motion estimates from inertial sensors or optical flow techniques, other input data, and confidence levels associated with each of these inputs. The system can be modeled to output the position and/or orientation of the user using a maximum likelihood estimation (MLE) approach. Likelihood is closely related to the more familiar concept of probability. For example, the probability p of an event x, dependent upon model parameters θ, is defined as:

$$P(x|\theta).$$

The likelihood function l for θ, on the other hand, is defined as:

$$l(\theta|x) = p(x|\theta)$$

That is, the likelihood l characterizes the parameters θ of the model given the observed data x. Maximum likelihood estimation aims to find the parameter(s) θ that make the observed data x most likely. MLE approaches can include Kalman filtering or variations thereof (e.g., extended Kalman filter, unscented Kalman filter), particle filtering, among others.

In Kalman filtering, the state of a linear system can be estimated based on a Gaussian distribution of the state. Kalman filtering comprises two steps—prediction and correction. The prediction step uses the state model to predict the new state of the parameters of the model:

$$\overline{X}^t = \vec{D} X^{t-1} + W,$$

$$\overline{\Sigma}^t = \vec{D} \Sigma^{t-1} \vec{D}^T + Q^t,$$

where $\overline{X}^t$ is the state prediction at time t, $\overline{\Sigma}^t$ is the covariance prediction at time t, $\vec{D}$ is the state transition matrix correlating the relationship between the state parameters at time t and t−1, Q is covariance of the noise W. In the correction step, the current measurement Zt is used to update the object's state:

$$K^t = \overline{\Sigma}^t \overline{M}^T [\overline{M} \overline{\Sigma}^t \overline{M}^T + R^t]^{-1},$$

$$X^t = \overline{X}^t + K^t \underbrace{\left[R^t - \overline{M} \overline{X}^t\right]}_{v},$$

$$\Sigma^t = \overline{\Sigma}^t - K^t \overline{M} \overline{\Sigma}^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

When using a Kalman filter for tracking a user, the state of the Kalman filter may represent, for example, one or more of a position of the user relative to the device, a velocity or acceleration of the user with respect to the device, a position of the device, and motion of the device. The measurements used by the Kalman filter may include, for example, a location of the user as determined from camera images and measurements from inertial or other sensors of the device. For each new set of measurements obtained by the device the Kalman filter may be updated to obtain a new estimate of the location of the user relative to the device.

In particle filtering, the state of the object is modeled as a sampling probability instead of as a Gaussian distribution. Particle filtering models the conditional state density $P(Xt|Zt)$ at time t as a set of samples or particles $\{s_t^n: n=1, \ldots, N\}$ with sampling probability or weights $\pi_t^n$. The weights are used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $$c_{t-1}^{j-1} > r$$

and setting $\hat{s}_t^n = \hat{s}_{t-1}^j$. In the prediction step, for each selected $\hat{s}_t^n$, a new sample is generated by:

$$s_t^n = f(\hat{s}_t^n, \vec{W}_t^n),$$

where $\vec{W}_t^n$ is a zero mean Gaussian error and f is a non-negative function, i.e., $f(s)=s$. In the correction step, weights $\pi_t^n$ corresponding to the new samples $s_t^n$ are calculated using the measurements zt by:

$$\pi_t^n = p(z_t|x_t=s_t^n),$$

where p can be modeled as a Gaussian density. Using the new samples $\vec{S}_t$, the new position of the object can be estimated using:

$$\epsilon_t = \Sigma_{n=1}^N \pi_t^n f(s_t^n, \vec{W}).$$

When using a particle filter for tracking a user, the states and measurements may be the same as when using a Kalman filter. For each new set of measurements obtained at the device the particle filter may be used, as described above, to obtain a new estimate of the location of the user relative to the device.

FIGS. 6A to 6D illustrate an example of how an interface plane or element at different depths can be used to generate viewing-angle appropriate images in accordance with at least some embodiments. In FIG. 6A, the example orientation 600 has a user 602 substantially in front of a display element 604 of a device. For simplicity of explanation, the interface plane or element here is represented in three dimensions, with a box 606 on a background 608. At the current viewing angle, the user is only able to see the top surface 610 of the interface plane or element 606, as illustrated in the display view 620 of FIG. 6B. In the orientation 640 of FIG. 6C, the device has been rotated (or the user has moved with respect to the device). To provide an appropriate user experience in at least some embodiments, the interface plane or element is effectively rotated with the device, such that the interface plane or element and background 608 would rotate accordingly. Based on the current viewing direction of the user 602, it can be seen in the display view 660 of FIG. 6D that the viewable portion 662 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 6C that any area occluded by the right side of the interface plane or element in FIG. 6A now can be seen, and that the area occluded by the left side of the box is interface plane or element greater in FIG. 6C.

Figure 7A:
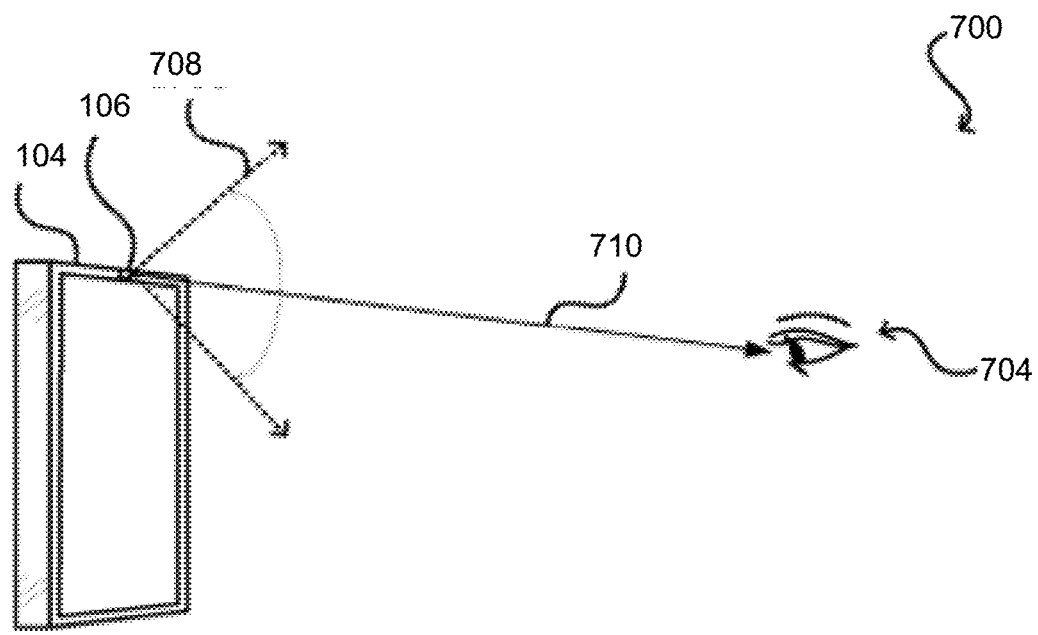
FIGS. 7A-7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 104 is configured to utilize at least one camera element 106 to attempt to locate a feature of a user, such as the user's head or eyes, for purposes of point of view determination. In this example, the user's eyes 704 are located within the field of view 708 of a camera of the computing device 104. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
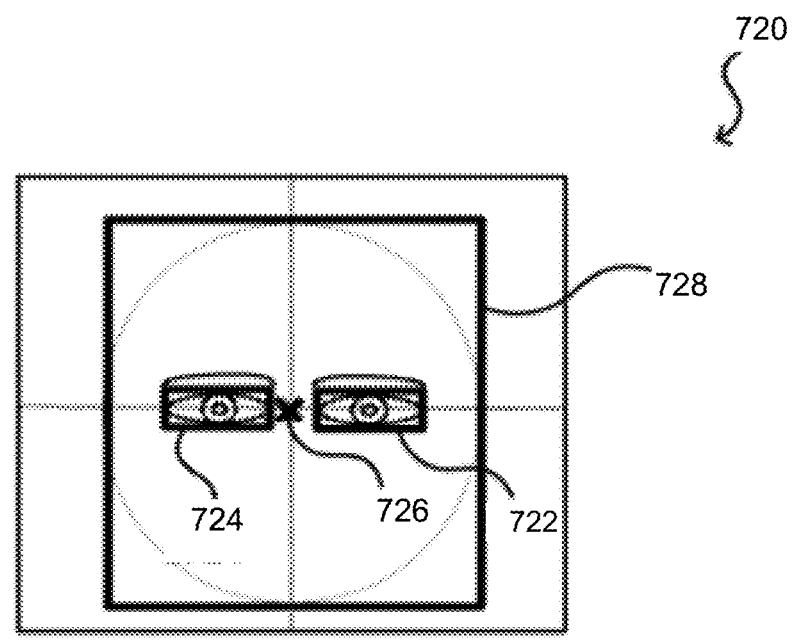

Further illustrating such an example approach, FIG. 7B illustrates an example image 720 that could be captured of the user's head and eyes using the camera 106 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

Figure 8:
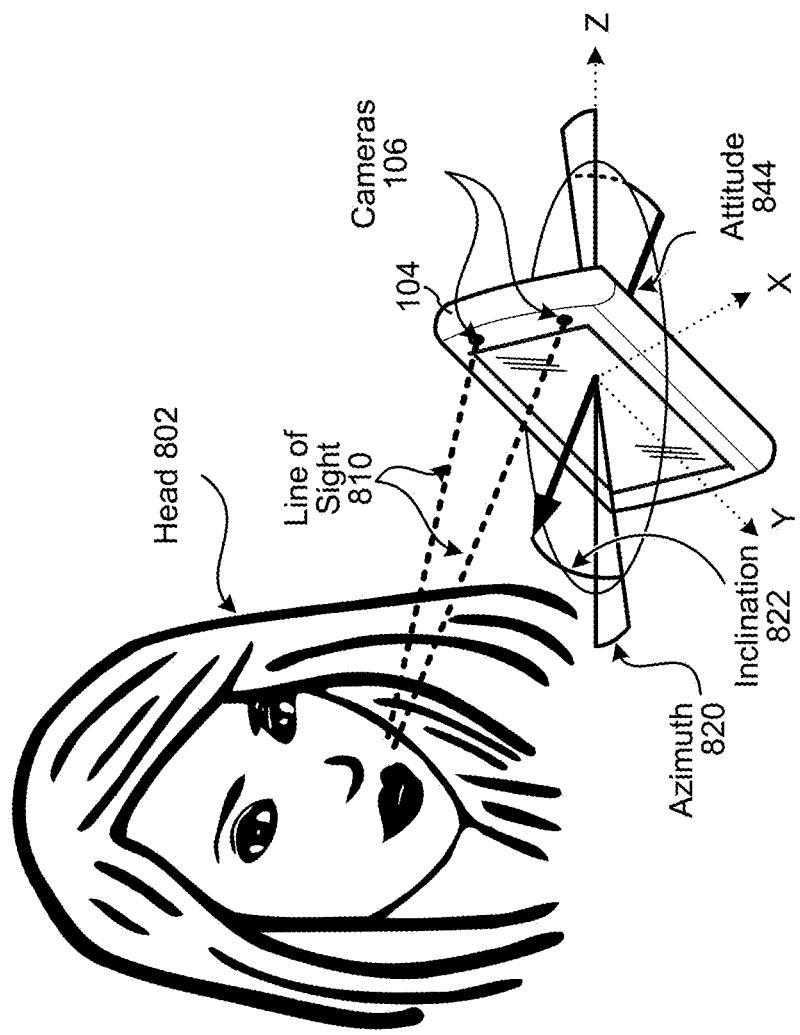
FIG. 8 illustrates using motion sensors with image processing to compute motion of a device in accordance with various embodiments.

FIG. 8 illustrates the use of the camera(s) 106 to determine orientation of the device 104 relative to a face/head 802 of a user while motion sensors may detect orientation/motion of the device 104. The position of the user/head may be determined based on the distance from the user to the device as well as based on the angle of the user/head relative to the device using camera(s) 106 and line of sight 810 using techniques described above. The device 104 may then render the UI based on the position of the user's face/head, for example using a projection matrix to render UI features as if the user's head is a camera projecting the UI. When a position of the user's head is established, certain changes to the head position may be detected using the motion sensors of the device, which provide output with lower latency that that of a head tracking system described above. The motion sensors of the device 104 may be used to track changes in device motion relative to an XYZ coordinate system (such as that illustrated in FIG. 8), relative to an angular position, such as an orientation measured in azimuth 820, inclination 822, or attitude, 824, or relative to some other measurement system. With a prior knowledge of the head position (as calculated by a camera based head tracking system) before a specific device motion, the device 104 may measure a change in orientation/position as measured by motion sensor(s) to compute an expected post-motion head position. The UI may then be rendered based on this expected post-motion head position.

Figure 9A:
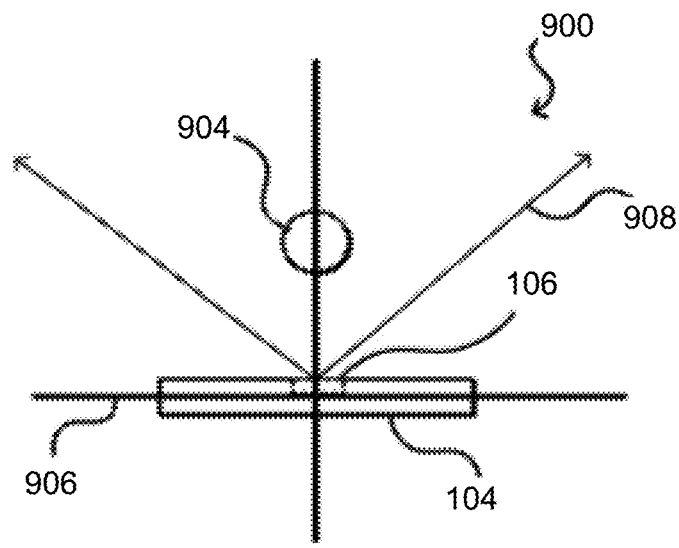
FIGS. 9A-9B illustrate an example approach to determining device motion that can be utilized in accordance with various embodiments.

For example, FIG. 9A illustrates a "top view" 900 of a computing device 104 operable to capture an image of an object 904 (e.g., a user's head) within an angular view 908 of a camera 106 of the computing device. In this example, the computing device 104 includes at least one orientation- or rotation-determining element, such as an electronic compass or electronic gyroscope, that is able to determine a frame of reference 906 in two or three dimensions with respect to a first orientation of the device. In at least some embodiments, an electronic compass might be used to determine an axis of the frame of reference 906, as may correspond to a North direction, etc. In other embodiments, a component such as an electronic gyroscope might be calibrated periodically with a component such as a compass, but might instead determine changes in orientation about three axes of rotation over time. Various other approaches to determining changes in orientation about one, two, or three axes of rotation can be used as well within the scope of the various embodiments.

A first frame of reference 906 or orientation can be determined at or near the time of capture of a first image by a camera 106 of the computing device 104. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 9B:
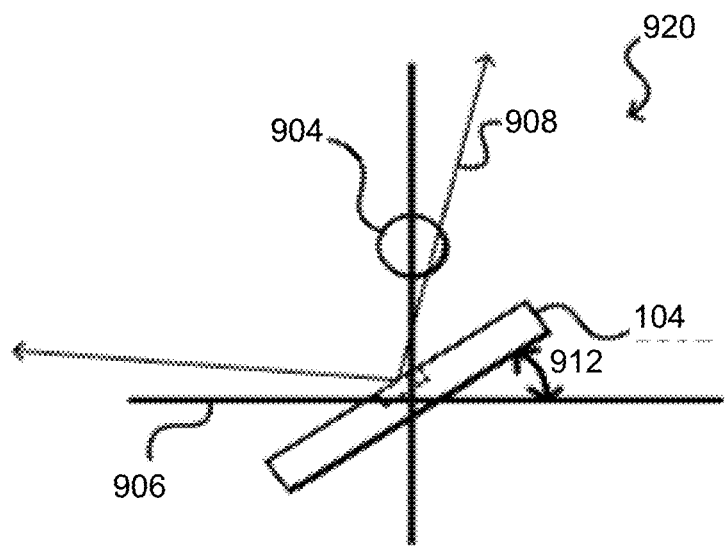

FIG. 9B illustrates a second top view 920 after a change in orientation of the computing device 104. The electronic gyroscope (or other such component or embedded sensor) can detect the change in orientation, in this example corresponding to a change in angle 912 with respect to the frame of reference in the plane of the figure. The gyroscope can present information about the change in orientation in any appropriate form, such as in angles or radians of change for one, two, or three degrees (e.g., Δx, Δy, Δz), percentage changes in pitch, roll, and yaw, etc. In this example, the change in orientation is determined to be a given angular amount of rotation 912 about a single axis. As illustrated, this causes the object 904 to be moved to the right edge of the field of view 908 of the camera 106. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 10:
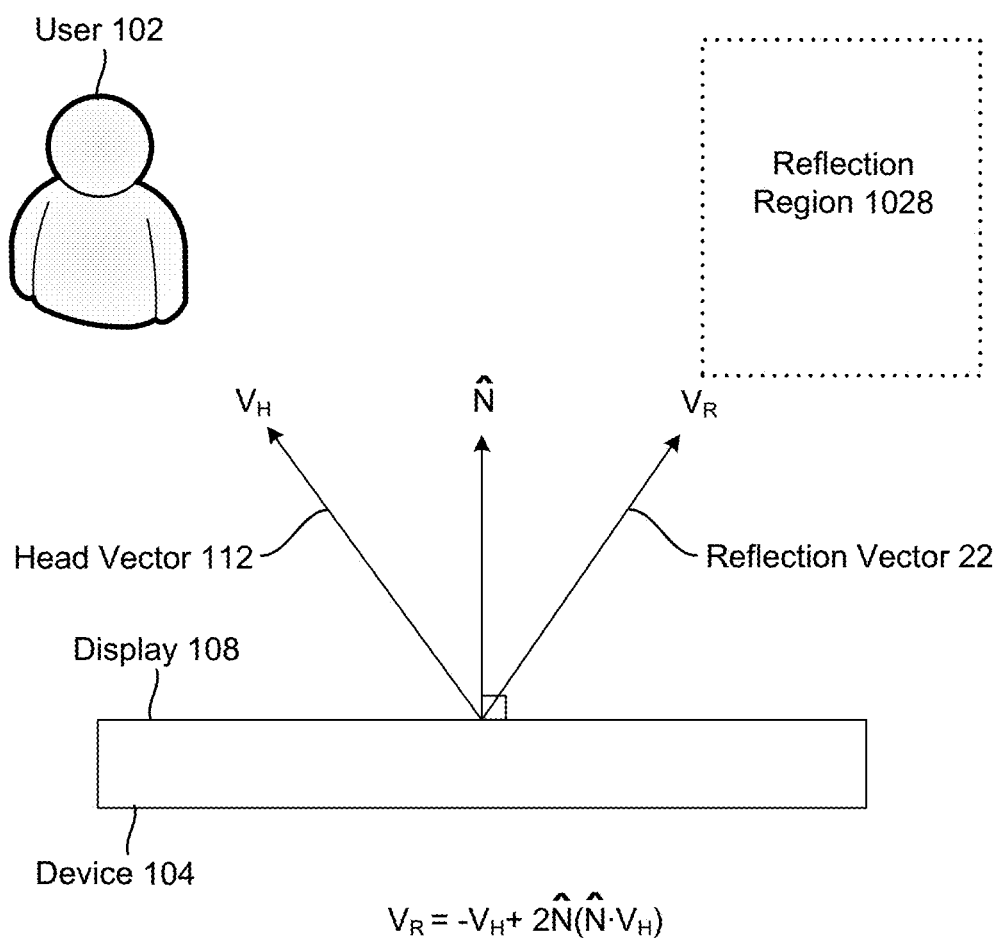
FIG. 10 illustrates an example approach for determining a reflection vector based on a head vector in accordance with various embodiments.

FIG. 10 illustrates an example approach for determining a reflection vector based on a head vector 112 in accordance with various embodiments. As discussed above, the head vector 112 is a three-dimensional vector from a point at the center of the display 108 to a point on the head of the user 102, such as between the user's eyes or to a dominant eye of the user 102. After calculating the head vector 112 using the methods described above, the device 104 may calculate a reflection vector 22. The reflection vector 22 is a three-dimensional vector from a point at the center of the display 108 extending to an object(s) and/or region that is visible to the user 102 as a reflection on the display 108. As illustrated in FIG. 10, an area visible to the user 102 is a reflection region 1028. The device 104 may calculate the reflection vector 22 using the following equation: $V_R = -V_H + 2N(N \cdot V_H)$, where $V_R$ is the reflection vector 22, $V_H$ is the head vector 112, N is a normal vector for the display 108, and $N \cdot V_H$ is a dot product between the normal vector and the head vector 112. The normal vector is a unit vector and the reflection vector 22 and the head vector 112 may be approximated as unit vectors, although the disclosure is not limited thereto.

In some embodiments, the device 104 may determine head vectors for a plurality of display pixels based on the head vector 112. For example, based on a location of an individual display pixel on the device 104, the device 104 may determine a corresponding head vector between the individual display pixel to the point on the head of the user 102, such as between the user's eyes or to the dominant eye of the user 102. Similarly, the device 104 may determine reflection vectors corresponding to the head vectors for the plurality of display pixels. In a first example, the device 104 may determine a head vector and a corresponding reflection vector for every display pixel included in the display 108. In a second example, the device 104 may group display pixels and determine a head vector and a corresponding reflection vector for every group of display pixels. In a third example, the device 104 may determine a head vector and a corresponding reflection vector for each corner of the display 108 and use these reflection vectors to determine a size of the reflection region 1028.

Figure 11:
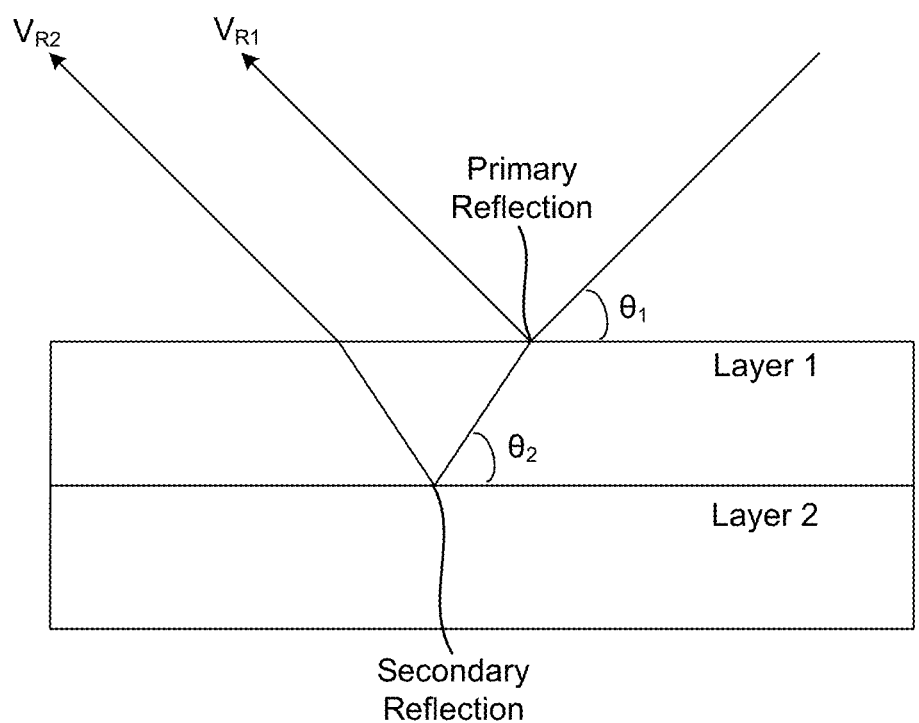
FIG. 11 illustrates an example of a multi-layered surface generating a secondary reflection.

FIG. 11 illustrates an example of a multi-layered surface generating a secondary reflection. As illustrated in FIG. 11, a primary reflection may reflect off a first layer based on a first angle $\theta_1$ and may result in a first reflection vector $V_{R1}$, while a secondary reflection may reflect off a second layer based on a second angle $\theta_2$ and may result in a second reflection vector $V_{R2}$. The primary reflection and the secondary reflection may be calculated using methods known to one of skill in the art. To compensate for potential glare, the device 104 may dim pixels affected by the primary reflection, the secondary reflection or a combination of the primary reflection and the secondary reflection. For example, the primary reflection and the secondary reflection may be additive and so pixels affected by both the primary reflection and the secondary reflection may be dimmed more than pixels affected by either the primary reflection and the secondary reflection alone. In addition, as will be described in greater detail below, the device 104 may dim pixels affected by the primary reflection and the secondary reflection by multiplying an intensity of the glare by the index of refraction associated with the primary reflection and/or the secondary reflection.

Figure 12:
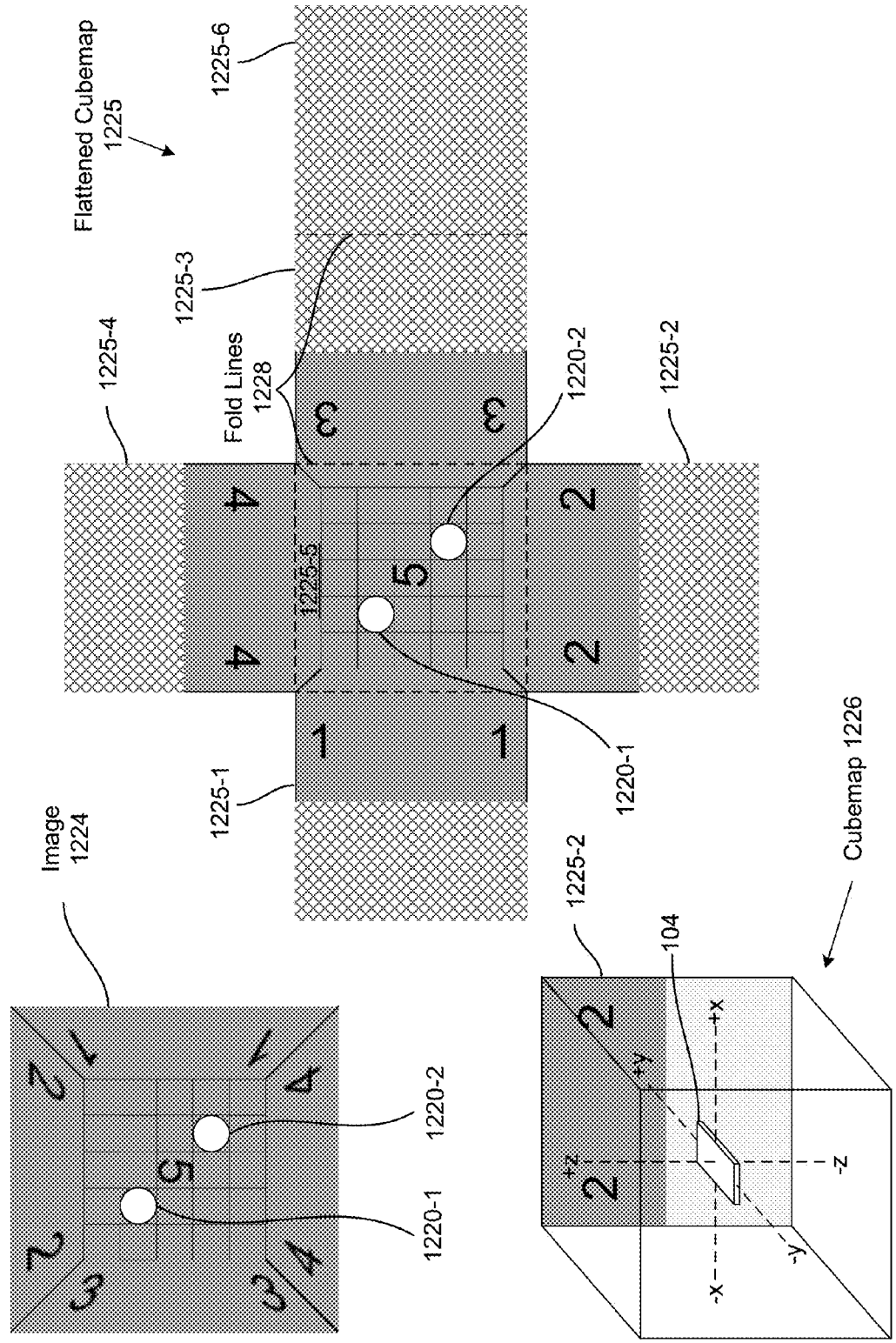
FIG. 12 illustrates an example of an environment map generated from an image in accordance with various embodiments.

FIG. 12 illustrates an example of an environment map generated from an image 1224 in accordance with various embodiments. To provide a simple example of environment mapping, a device 104 may be located in a room having a floor, four walls and a ceiling. The device 104 may be parallel to the ceiling and may capture image data representing image 1224 using one or more camera(s) 106. The image 1224 may include image information such as portions of a first wall (labeled "1"), a second wall (labeled "2"), a third wall (labeled "3"), a fourth wall (labeled "4") and a ceiling (labeled "5"), which includes first light source 1220-1, second light source 1220-2 and a ceiling grid pattern. The floor of the room is outside a field of view of the camera 106 and therefore is not included in the image 1224. The first wall and the third wall may be along an x axis relative to the device 104, the second wall and the fourth wall may be along a y axis relative to the device 104 and the ceiling and the floor may be along a z axis relative to the device 104.

The device 104 may process the image 1224 to generate a flattened cubemap 1225 that is made up of six separate sections. The first section 1225-1 may be in a negative x direction relative to the device 104 and may include the first wall. The second section 1225-2 may be in a positive y direction relative to the device 104 and may include the second wall. The third section 1225-3 may be in a positive x direction relative to the device 104 and may include the third wall. The fourth section 1225-4 may be in a negative y direction relative to the device 104 and may include the fourth wall. The fifth section 1225-5 may be in a positive z direction relative to the device 104 and may include the ceiling. The sixth section 1225-6 may be in a negative z direction relative to the device 104 and may include the floor. Due to the field of view of the camera 106, the sixth section 1225-6 and lower portions of sections 1225-1 to 1225-4 (which correspond to territory outside the field of view of camera(s) 106) are blank. The device 104 may process the image 1224 using any methods known to one of skill in the art. For example, the processing may change a perspective of sections 1225-1 to 1225-4 to simulate the device 104 facing each of the sections 1225-1 to 1225-4. This processing is illustrated by the labels "1," "2," "3," and "4" being aligned horizontally and vertically in the flattened cubemap 1225, whereas they were captured diagonally in the image 1224.

The flattened cubemap 1225 may be folded along fold lines 1228 to form cubemap 1226. Thus, the sections (1225-1 to 1225-6) may be digitally manipulated to face a center of the cubemap 1226, similar to the second section 1225-2 shown within the cubemap 1226. The device 104 is illustrated in the center of the cubemap 1226 along with axis lines showing an orientation of the device 104. If the device 104 is facing in the positive z direction, front-facing cameras may acquire image data in the positive z direction while rear-facing cameras may acquire image data in the negative z direction. As glare visible to the user is typically reflected from the front of the device 104, front-facing cameras may generally be used to create the cubemap 1226, although the disclosure is not limited thereto. For example, rear-facing camera(s) may be used to generate a cubemap or a more detailed environment map during a calibration step without departing from the present disclosure. A cubemap using data from rear facing cameras may then be used to reduce glare in the manner disclosed herein, such as in situations where a user rotates the device such that a light source that was originally seen by a rear facing camera is now in view of a front facing camera and is producing glare on the display.

FIG. 12 illustrates the device 104 as extending along the y axis parallel to the ceiling and the cubemap 1226 includes image information in the positive z direction, including the fifth section 1225-5 and portions of sections 1225-1 to 1225-4. If the device 104 was instead extending along the z axis parallel to the third wall, a corresponding cubemap would include image information in the positive x direction, including the third section 1225-3 and portions of the second section 12 25-2, the fourth section 12 25-4, the fifth section 12 25-5 and the sixth section 12 25-6. Similarly, any other orientation of the device 104 would result in a different cubemap containing image information in different portions of the flattened cubemap 1225. In some embodiments, the device 104 may generate an environment map for the room and may orient a cubemap based on the environment map. Therefore, in these embodiments the device 104 may update an orientation of the device 104 within the cubemap based on a location and direction of the device 104.

In some examples, the flattened cubemap 1225 may be obtained by flipping (inverting) the image 1224 along a horizontal axis and along a vertical axis, as illustrated in FIG. 12. However, some forward-facing cameras captured a flipped (inverted) image, and in those examples the flattened cubemap may be obtained by flipping (inverting) the image along a vertical axis. However, the disclosure is not limited thereto and the device 104 may obtain and/or manipulate the image 1224 and/or the flattened cubemap 1225 using any methods known to one of skill in the art to approximate an environment surrounding the device 104.

In some embodiments, the device 104 may use a fixed orientation based on a location of the camera(s) 106 relative to the device 104. For example, the device 104 may use the orientation illustrated within cubemap 1226, where a front-facing camera 106 of the device 104 is always facing in the positive z direction. Instead of changing the orientation of the device 104 in the cubemap based on the orientation of the device 104 within the room, the device 104 may update the cubemap with different image information for the room. For example, the flattened cubemap 1225 is generated from the image 1224 when the y axis of the device 104 extends along a length of the first wall and the device 104 is parallel to the ceiling. In a first example, if the device 104 rotates to face the third wall, the image information included in the flattened cubemap 1225 may shift to the left in a corresponding flattened cubemap so that the fifth section would be centered on the third wall. The first section would include a portion of the ceiling while the third section would include a portion of the floor. The second section would still include the second wall, but the portion of the second wall would change from a horizontal portion adjacent to the ceiling to a vertical portion adjacent to the third wall. Similarly, the fourth section would include a vertical portion of the fourth wall adjacent to the third wall. The sixth section would include the first wall if there was any image information available for the first wall. In a second example, if the device 104 rotates to face the first wall, the image information included in the flattened cubemap 1225 may shift to the right in a corresponding flattened cubemap so that the fifth section would be centered on the first wall, and each of the other sections would change accordingly.

In some embodiments, the device 104 may capture image data representing an image and generate a cubemap based on the captured image data. Thus, in the first example described above, the corresponding flattened cubemap may contain image information acquired from the captured image data that is different than image information included in the flattened cubemap 1225. Therefore, while the objects captured may be the same between different cubemaps, the image information used in the cubemaps may be different.

In other embodiments, the device 104 may generate multiple cubemaps based on the same image information. Thus, in the first example described above, portions of the corresponding flattened cubemap may be based on the same image information as the flattened cubemap 1225, although the image information may be modified or processed differently between the cubemaps. In a first embodiment, the device 104 may reuse image information in a new cubemap for minor variations in rotation/position and/or to reduce a latency caused by acquiring additional image information. For example, the device 104 may reuse the image information for the new cubemap if the device 104 predicts that the image information covers a reflection region in the new cubemap. Determining the reflection region will be described in greater detail below with regard to FIG. 15. In a second embodiment, the device 104 may generate a stitched image including image information from multiple images. For example, if the device 104 rotates 20 degrees in the positive x direction, the device 104 may capture image data representing an additional image and add the image data to the stitched image. If the device 104 then rotates 20 degrees in the negative x direction, the device 104 may use the stitched image without needing to capture additional image data. The stitched image may be maintained for a fixed period of time or may be maintained based on a location of the device 104. For example, if the device 104 determines that the user 102 is traveling along a path, the stitched image may be periodically replaced and/or maintained for only a short time as the stitched image is unlikely to remain accurate. In contrast, if the device 104 determines that the user 102 is stationary, the stitched image may be periodically updated and/or maintained for a longer time as the stitched image is likely to remain accurate based on the lack of movement.

In some embodiments, the device 104 may capture image data at periodic intervals and/or based on a rotation and/or movement of the device 104 as detected by the head tracking system or by various motion sensors, such as those discussed below with regard to FIG. 19. As an example, the device 104 may capture image data several times a second or every several seconds and update a cubemap or a stitched image accordingly. As another example, the device 104 may detect a rotation and/or movement of the device 104 and may capture image data based on the rotation and/or movement of the device 104 exceeding a threshold. For example, the device 104 may determine when blank areas lacking image information in a cubemap exceeds a threshold based on the rotation and/or movement of the device 104. The device may then add to/refresh a cubemap if the device movement exceeds the threshold.

Various combinations of the above described embodiments may be used without departing from the disclosure. For example, the device 104 may capture new image data while reusing old image data. Similarly, the device 104 may capture image data representing images based on a rotation and/or movement of the device 104 and at fixed intervals to provide updated image information for changing lighting conditions.

While FIG. 12 illustrates the flattened cubemap 1225 aligning perfectly with edges of the room, this is intended as a simple illustration to demonstrate how to create a potential cubemap. In practice, cubemaps may be generated based on an area seen by the device 104 without any correlation between the sections of the flattened cubemap and walls surrounding the device 104. Thus, a cubemap may be visualized as a cube floating around the device 104 and may be an approximation of the surrounding area based on angles to the device 104. Therefore, the cubemap is not intended to conform with a layout of the surroundings. For example, if the device 104 captures image data representing an image of a ceiling in a large room, the ceiling may extend beyond the fifth section of a corresponding flattened cubemap and portions of the ceiling may be included in other sections, such as the second light source 1220-2 being included in a second section. While the corresponding flattened cubemap does not conform to the layout of the large room (as in, the second section is not limited to the second wall of the large room), an angle between the device 104 and the second light source 1220-2 in the second section may be equivalent to an angle between the device 104 and the second wall in the second section 1225-2 illustrated in FIG. 12.

The device 104 may not have enough information to create an ideal cubemap and the device 104 may generate an incomplete cubemap with errors or inconsistencies due to optical aberrations, distortion, other imperfections, lack of information, obstructions, etc. For example, the user 102 or other objects may be present in the cubemap as an obstruction, blocking the device 104 from viewing a portion of the surroundings. Despite these errors and/or inconsistencies, the device 104 may use the incomplete cubemap to approximate the surroundings and may include additional steps to increase a precision of calculations involving the incomplete cubemap. For example, the device 104 may determine if errors and/or inconsistencies exceed a threshold and may capture image data representing additional images to provide more image information. Alternatively, the device 104 may use a first approximation to generate the incomplete cubemap and may use a second approximation, requiring more processing for a more detailed approximation, for areas associated with light sources or included in the reflection region which will be discussed in greater detail below.

Figure 13A:
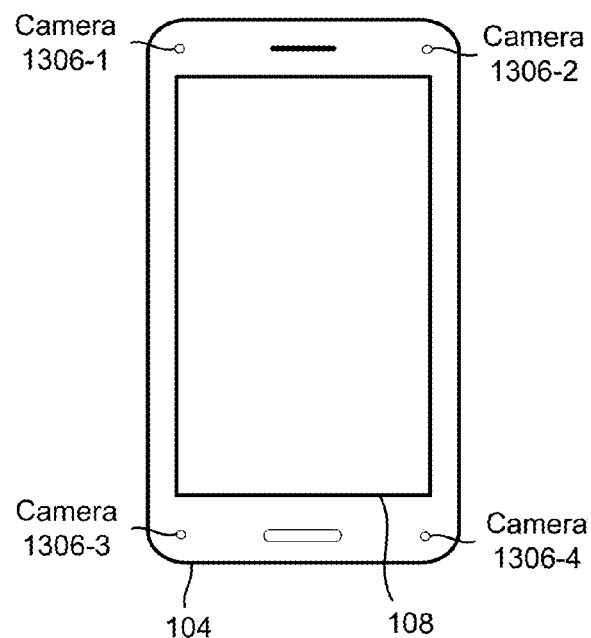
FIGS. 13A-13E illustrate a device having multiple cameras and an example approach for generating a combined image from image data representing multiple captured images in accordance with various embodiments.
Figure 13B:
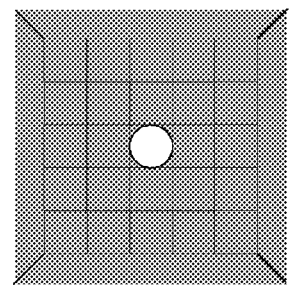
Figure 13C:
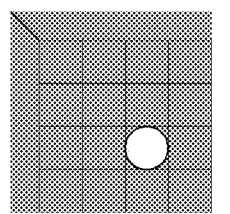
Figure 13C:
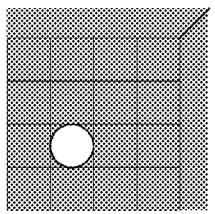
Figure 13C:
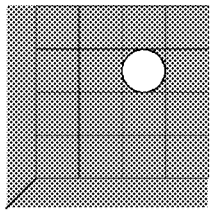
Figure 13C:
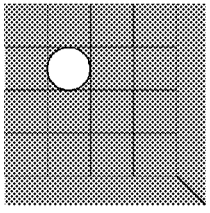
Figure 13D:
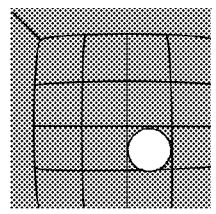
Figure 13D:
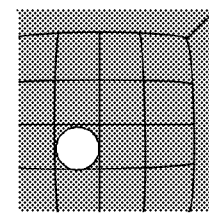
Figure 13D:
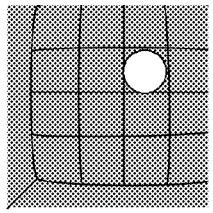
Figure 13D:
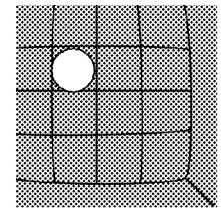

FIGS. 13A-13E illustrate a device having multiple cameras 1306 and an example approach for generating a combined image from image data representing multiple captured images in accordance with various embodiments. As illustrated in FIG. 13A, the device 104 may include four cameras 1306; first camera 1306-1, second camera 1306-2, third camera 1306-3 and fourth camera 1306-4. The disclosure is not limited thereto, however, and the device 104 may include any number of cameras 1306. To provide an example of how image data representing images captured by the cameras 1306 may be combined, FIG. 13B illustrates a view 1320 of a ceiling visible to the device 104, but each of the cameras 1306 see only a portion of the view 1320. For example, FIG. 13C illustrates a first view 1322-1 visible to the first camera 1306-1, a second view 1322-2 visible to the second camera 1306-2, a third view 1322-3 visible to the third camera 1306-3 and a fourth view 1322-4 visible to the fourth camera 1306-4. In addition, image data representing images captured by the cameras 1306 may include optical aberrations, distortions and/or other imperfections and are not identical to the views 1322. For example, FIG. 13D illustrates a first capture 1324-1 different than the first view 1322-1, a second capture 1324-2 different than the second view 1322-2, a third capture 1324-3 different than the third view 1322-3 and a fourth capture 1324-4 different than the fourth view 1322-4.

Figure 13E:
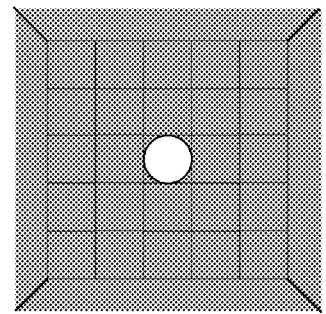
Figure 13E:
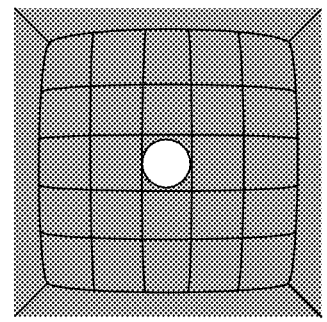
Figure 13E:
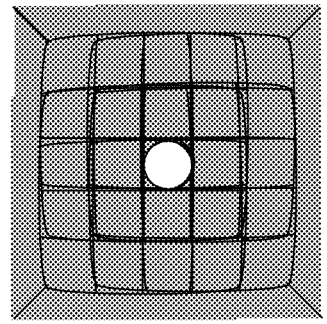

FIG. 13E illustrates the captures 1324 being combined into overlaid capture 1326. As illustrated by overlaid capture 1326, the device 104 may include image data from each of the cameras 1306 and may overlay the image data to create overlaid image information with redundant data points. The device 104 may generate a merged capture 1328 based on the overlaid image information. In a first embodiment, the device 104 may stitch together the captures 1324, combining portions of the captures 1324 while processing and/or modifying the captures 1324 so that boundaries between adjacent portions of the captures 1324 may align. An example of the first embodiment may be portions of different images combined with transitions between the portions of different images. In a second embodiment, the device 104 may analyze the overlaid image information and may determine an appropriate image based on the overlaid image information. An example of the second embodiment may be averaging the overlaid image information and generating a new image distinct from the original image information. For example, while the first capture 1324-1 may include a first line at a first location and the second capture 1324-2 may include the first line at the second location, the device 104 may determine that the first line should appear at a third location between the first location and the second location. The device 104 may generate the merged capture 1328 using any methods known to one of skill in the art and the disclosure is not limited to the examples described above.

After generating the merged capture 1328, the device 104 may generate a corrected capture 1330 to correct for optical aberrations, distortions and/or other imperfections caused by the cameras 1306. The device 104 may generate the corrected capture 1330 using any methods known to one of skill in the art. In some embodiments, the device 104 may correct the captures 1324 for optical aberrations, distortions and/or other imperfections caused by the cameras 1306 prior to generating the overlaid capture 1326 and the merged capture 1328. In addition, the device 104 may correct both the captures 1324 and the corrected capture 1330 for optical aberrations, distortions and other imperfections without departing from the disclosure. As the cameras 1306 are fixed relative to the device 104, the device 104 may use a single algorithm to combine the captures 1324, correct for optical aberrations and generate a cubemap based on relative angles to the cameras 1306.

The corrected capture 1330 may be used to generate a cubemap having more image information than is available in a single capture 1324. In addition, the device 104 may use the redundant data points included in the overlaid capture 1326, where matching points of interest were included in two or more captures 1324, to approximate a depth of the point of interest from the device 104 using any methods known to one of skill in the art.

While FIGS. 13A-13E illustrate the device 104 combining simultaneous image data captures from multiple cameras into the corrected capture 1330, the disclosure is not limited thereto. Instead, the device 104 may use a similar process to combine image data from multiple image data captures taken by a single camera at different points in time or multiple image data captures taken by multiple cameras at different points in time to generate a stitched image. As discussed above, the stitched image may be used to generate multiple cubemaps, which may be beneficial when the device 104 is confined to a single area with static light source(s). As the location of the device 104 is relatively stationary, such as moving within a room, the device 104 may map the room using image data representing multiple images and may identify light source(s) visible to the device 104 within the room. As a result, the device 104 may reduce a latency time associated with identifying the light source(s) and generating a cubemap. Instead, the device 104 may update the cubemap from the stitched image based on rotations and movements to the device 104 and may determine the reflection region within the cubemap based on changes to a head vector 112.

Figure 14:
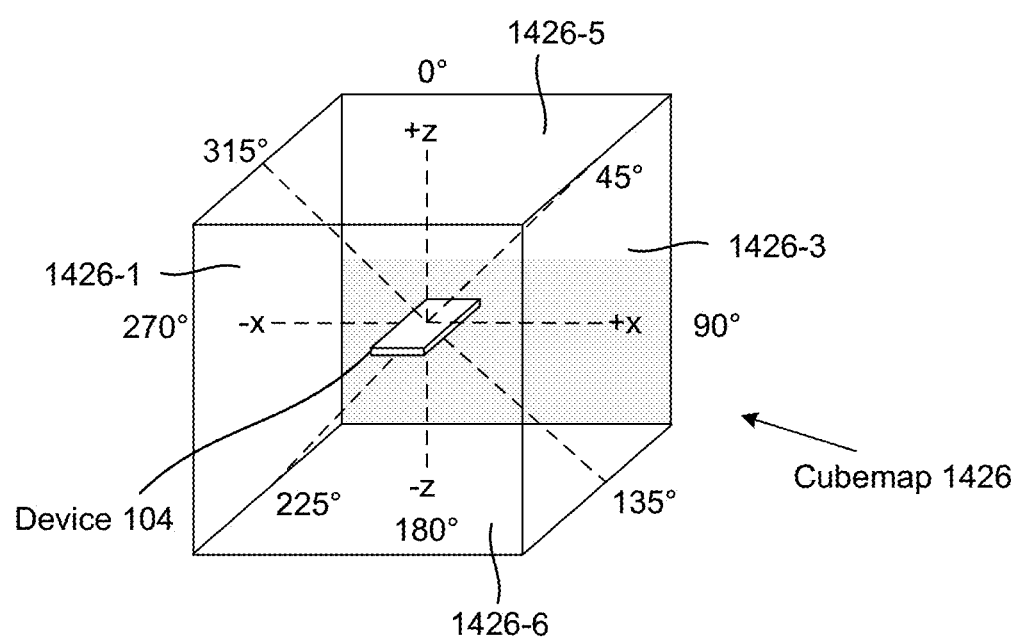
FIG. 14 illustrates an example approach for approximating a surrounding area into a cubemap based on angles to the device in accordance with various embodiments.

FIG. 14 illustrates an example approach for approximating a surrounding area into a cubemap 1426 based on angles to the device 104 in accordance with various embodiments. As discussed above, in some embodiments a cubemap may be visualized as a cube floating around the device 104 and may be an approximation of a surrounding area based on angles to the device 104. If an orientation of the device 104 is fixed within the cubemap 1426, certain angles may be used to approximate the surrounding area on the cubemap 1426. FIG. 14 illustrates angles between the device 104 and the cubemap 1426 relative to an X-Z plane that may be used to demark edges of the cubemap 1426 along the Y axis. While not illustrated in FIG. 14, similar angles may be used relative to the Y-Z plane to demark edges of the cubemap 1426 along the X axis and relative to the X-Y plane to demark edges of the cubemap 1426 along the Z axis.

As illustrated in FIG. 14, a positive z direction may be considered 0°, a positive x direction may be 90°, a negative z direction may be 180° and a negative x direction may be 270° relative to the X-Z plane. Using this framework, an edge between a fifth section 1426-5 and a third section 1426-3 may be located at 45°. Similarly, an edge between the third section 1426-3 and a sixth section 1426-6 may be located at 135°, an edge between the sixth section 1426-6 and a first section 1426-1 may be located at 225° and an edge between the first section 1426-1 and the fifth section 1426-5 may be located at 315°. Thus, the fifth section 1426-5 may extend between 315° and 45°, the third section 1426-3 may extend between 45° and 135°, the sixth section 1426-6 may extend between 135° and 225° and the first section 1426-1 may extend between 225° and 315° relative to the X-Z plane. Using this configuration, the device 104 may process image information to generate the cubemap 1426 based on perceived angles to the device 104 without needing distance information.

Figure 15:
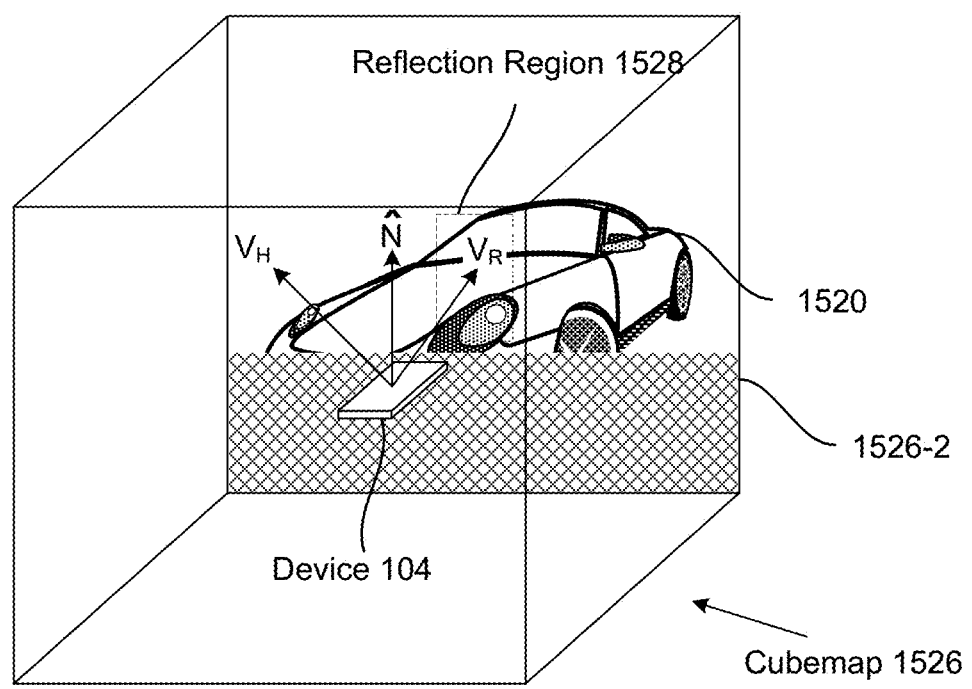
FIG. 15 illustrates an example approach for determining a reflection region in a cubemap using the reflection vector in accordance with various embodiments.

FIG. 15 illustrates an example approach for determining a reflection region 1528 in a cubemap 1526 using the reflection vector 22 in accordance with various embodiments. FIG. 15 illustrates an orientation of a device 104 within the cubemap 1526, along with a head vector 112 ($V_H$), a normal vector $\hat{N}$ and a reflection vector 22 ($V_R$). For illustrative purposes, the cubemap 1526 includes a second section 1526-2 having an automobile 1520.

Based on the position of the user 102 relative to the device 104, the user 102 may see a reflection in the device 104. To approximate the reflection, the device 104 may calculate the reflection vector 22 based on the head vector 112, as discussed above with regard to FIG. 10. Similarly, the device 104 may generate the cubemap 1526 as an approximation of an area surrounding the device 104, as discussed above with regard to FIGS. 12 and 14. The device 104 may determine a reflection region 1528 in the cubemap 1526 based on the reflection vector 22. For example, the device 104 may locate a point in the second section 1526-2 based on an angle of the reflection vector 22 and may identify the point as a center of the reflection region 1528. The device 104 may then approximate a shape and size of the reflection region 1528 based on a size of the device 104 and other information, such as a distance between the user 102 and the device 104.

The device 104 may approximate a shape of the reflection region 1528 in various ways. In some embodiments, such as when an orientation of the device 104 is fixed within the cubemap 1526, a shape of the reflection region 1528 may be approximated as a rectangle. In other embodiments, such as when the cubemap 1526 is fixed and an orientation of the device 104 may change within the cubemap 1526, a shape of the reflection region 1528 may be approximated as a quadrilateral and may be based on the head vector 122, the reflection vector 22 and/or a location of the reflection region 1528 within the cubemap 1526. However, the disclosure is not limited thereto and the shape of the reflection region may be approximated using any method known to one of skill in the art. For example, if the reflection region 1528 overlaps more than one section of the cubemap 1526, the device 104 may approximate the shape of the reflection region 1528 using one or more of a variety of shapes to compensate for potential optical aberrations.

The device 104 may approximate a size of the reflection region 1528 in various ways. In some embodiments, the device 104 may approximate the size of the reflection region 1528 based on a distance between the user 102 and the device 104. For example, as the user 102 moves closer to the device 104, a size of the reflection region 1528 increases as more area is visible in the reflection on the device 104. Thus, an object within the reflection region 1528 appears smaller due to the increased field of view. Conversely, as the user 102 moves away from the device 104, a size of the reflection region 1528 decreases as less area is visible in the reflection on the device 104. Thus, an object within the reflection region 1528 appears larger due to the decreased field of view. FIGS. 16A-16E illustrate a size of a reflection region varying based on a length of the head vector 112 in accordance with various embodiments.

Figure 16A:
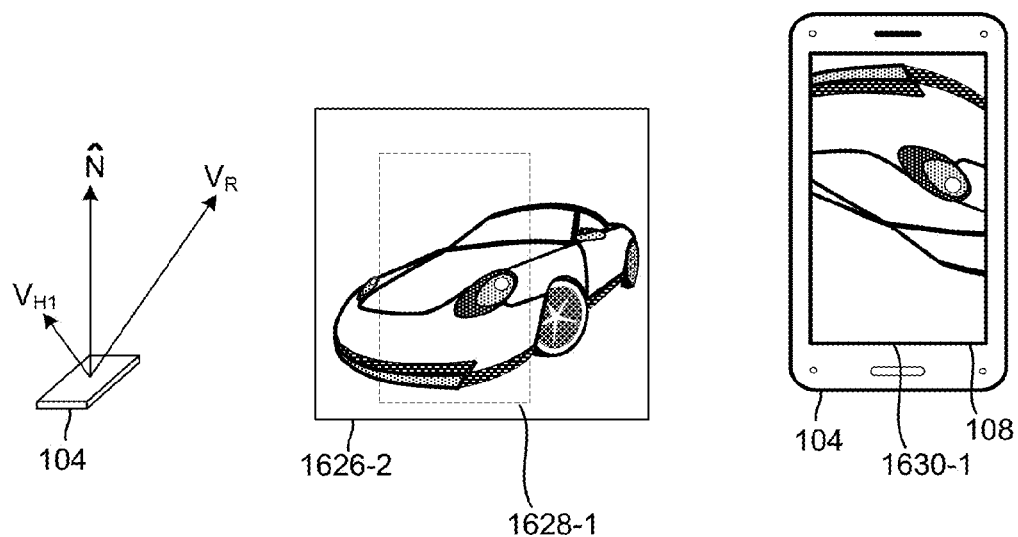

FIG. 16A illustrates a first head vector 112 ($V_{H1}$) having a relatively small length, which correlates to a distance between the user 102 and the device 104 being relatively small. As a result, an area of a first reflection region 1628-1 in a second section 1626-2 of a cubemap may be relatively large. Therefore, a first modified reflection region 1630-1 includes more of the second section 1626-2. The first modified reflection region 1630-1 is an approximation of a reflection on the display 108 visible to the user 102. To generate the first modified reflection region 1630-1, the device 104 may invert the first reflection region 1628-1 along an axis and scale the first reflection region 1628-1 to a size of the display 108. The device 104 may use the first modified reflection region 1630-1 to determine display pixels on the display 108 affected by light source(s) included in the first reflection region 1628-1, as discussed in greater detail below.

Figure 16B:
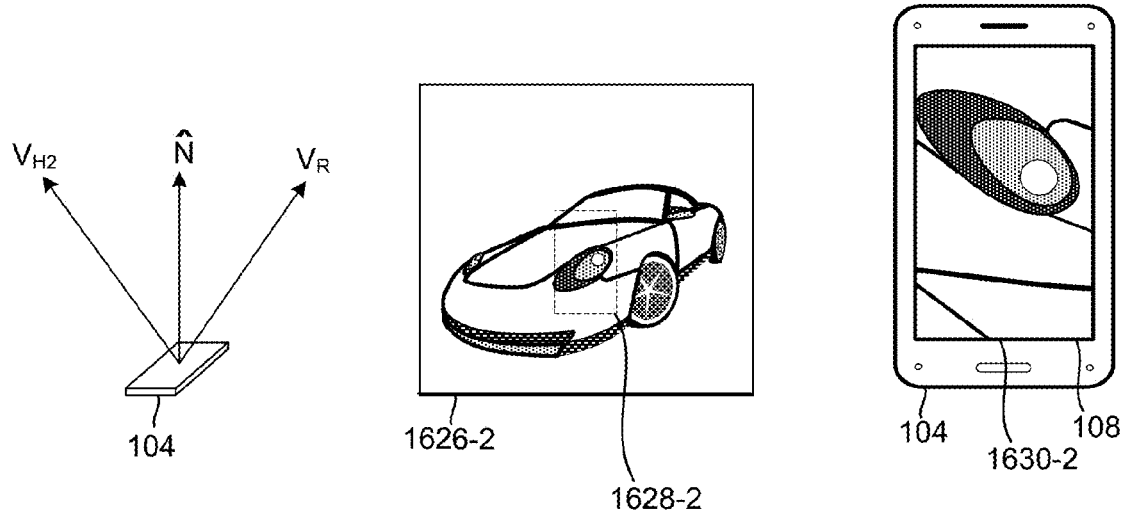

FIG. 16B illustrates a second head vector 112 ($V_{H2}$) having a relatively large length, which correlates to a distance between the user 102 and the device 104 being relatively large. As a result, an area of a second reflection region 1628-2 in the second section 1626-2 may be relatively small. Therefore, a second modified reflection region 1630-2 includes less of the second section 1626-2. The second modified reflection region 1630-2 is an approximation of a reflection on the display 108 visible to the user 102. To generate the second modified reflection region 1630-2, the device 104 may invert the second reflection region 1628-2 along an axis and scale the second reflection region 1628-2 to a size of the display 108. The device 104 may use the second modified reflection region 1630-2 to determine display pixels on the display 108 affected by light source(s) included in the second reflection region 1628-2, as discussed in greater detail below.

Figure 16C:
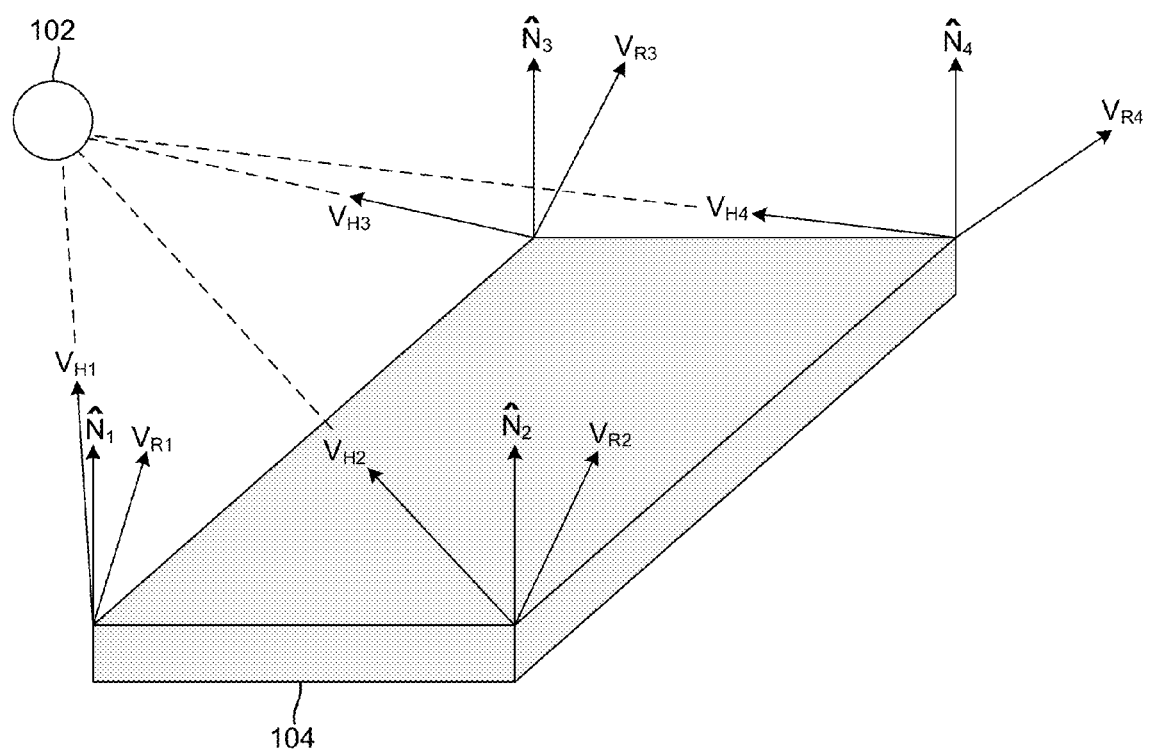
Figure 16E:
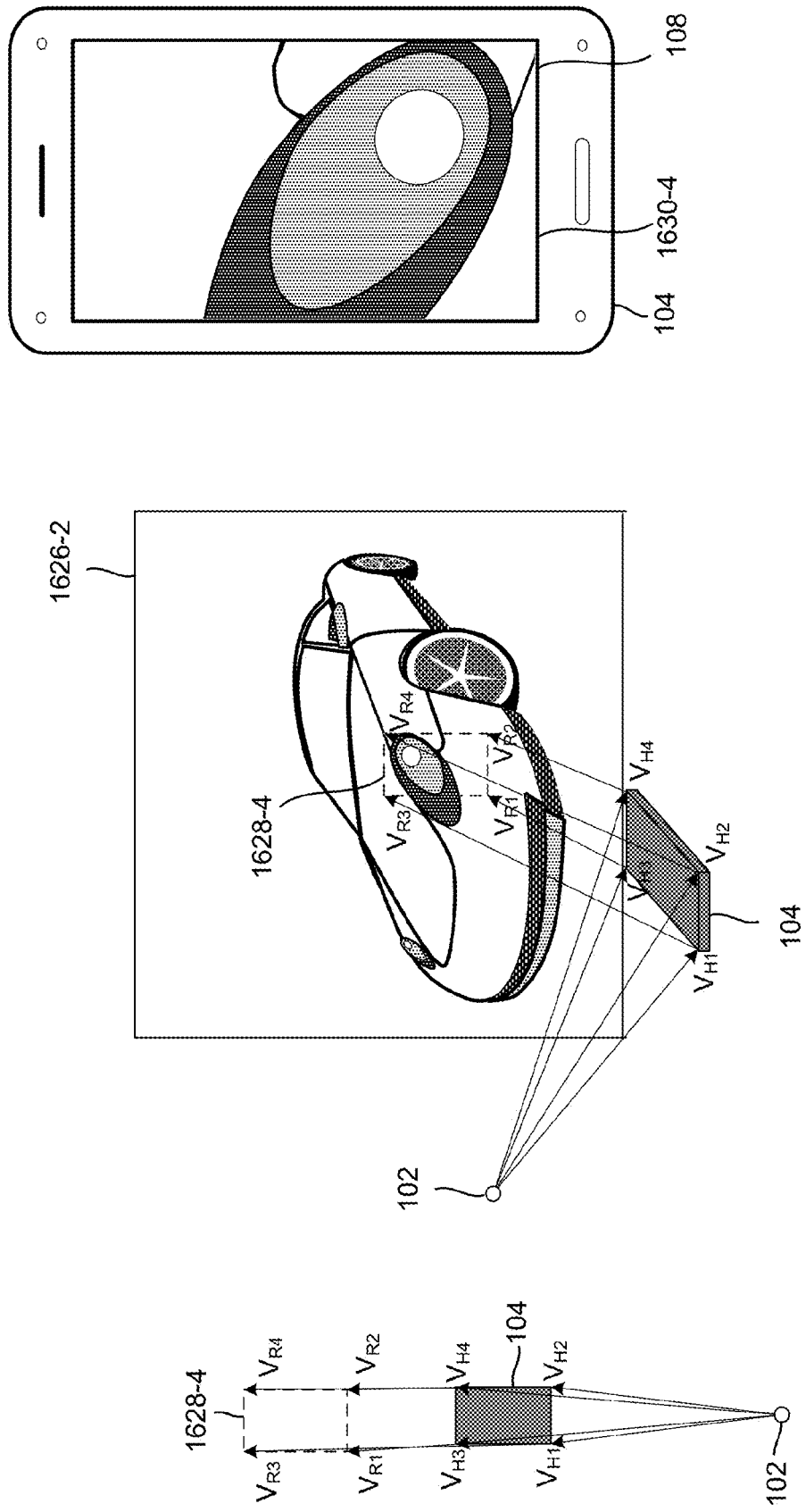

FIGS. 16A-16B illustrate an example of determining a reflection region, the device 104 determining a head vector and a reflection vector and selecting a size of the reflection region based on a distance from the user 102 to the device 104. However, the disclosure is not limited thereto and may vary. For example, the device 104 may determine a head vector for multiple display pixels based on a location of the display pixel relative to a fixed location on the device 104. The device 104 may then determine reflection vectors based on the head vectors and determine a size of the reflection region based on the reflection vectors. In some embodiments, the device 104 may determine a head vector and a reflection vector for each display pixel in the device 104. In other embodiments, the device 104 may determine a head vector and a reflection vector for a number of display pixels and may approximate the reflection region based on the reflection vectors. FIGS. 16C-16E illustrate an example of determining a size of the reflection region based on determining a reflection vector for each corner of the device 104.

FIG. 16C illustrates an example of calculating a reflection vector for each corner of the device 104. As illustrated in FIG. 16C, the device 104 determines a first head vector $V_{H1}$ between a first corner (bottom left) of the device 104 and the user 102, a second head vector $V_{H2}$ between a second corner (bottom right) of the device 104 and the user 102, a third head vector $V_{H3}$ between a third corner (top left) of the device 104 and the user 102, and a fourth head vector $V_{H4}$ between a fourth corner (top right) of the device 104 and the user 102. The device 104 may determine a first reflection vector $V_{R1}$ from the first head vector $V_{H1}$, a second reflection vector $V_{R2}$ from the second head vector $V_{H2}$, a third reflection vector $V_{R3}$ from the third head vector $V_{H3}$ and a fourth reflection vector $V_{R4}$ from the fourth head vector $V_{H4}$. While FIG. 16C illustrates first normal vector $\hat{N}1$, second normal vector $\hat{N}2$, third normal vector $\hat{N}3$ and fourth normal vector $\hat{N}4$, the device 104 may determine the reflection vectors using a single normal vector $\hat{N}$. Using the first head vector $V_{R1}$, the second head vector $V_{R2}$, the third head vector $V_{R3}$ and the fourth head vector $V_{R4}$ the device 104 may determine a size of a reflection region, as illustrated in FIGS. 16D-16E.

FIG. 16D illustrates an example of determining a third reflection region 1628-3. As a distance between the user 102 and the device 104 is relatively small, directions of head vectors $V_{H1}$-$V_{H4}$ may diverge. Thus, corresponding reflection vectors $V_{R1}$-$V_{R4}$ may separate and extend to corners of a relatively large third reflection region 1628-3. Therefore, a third modified reflection region 1630-3 shown on the display 108 may include more of the second section 1626-2 of the cubemap. The third modified reflection region 1630-3 is an approximation of a reflection on the display 108 visible to the user 102. To generate the third modified reflection region 1630-3, the device 104 may invert the third reflection region 1628-3 along an axis and scale the third reflection region 1628-3 to a size of the display 108. Alternatively, the device 104 may determine a reflection vector for each display pixel, as discussed above, and determine an individual pixel in the second section 1626-2 corresponding to the reflection vector. Thus, no inversion or scaling is involved as each display pixel is individually mapped to a pixel in the second section 1626-2. The device 104 may use the third modified reflection region 1630-3 to determine display pixels on the display 108 affected by light source(s) included in the third reflection region 1628-3, as discussed in greater detail below.

FIG. 16E illustrates an example of determining a fourth reflection region 1628-4. As a distance between the user 102 and the device 104 is relatively large, directions of head vectors $V_{H1}$-$V_{H4}$ may be similar. Thus, corresponding reflection vectors $V_{R1}$-$V_{R4}$ may extend to corners of a relatively small fourth reflection region 1628-4. Therefore, a fourth modified reflection region 1630-4 shown on the display 108 may include more of the second section 1626-2 of the cubemap. The fourth modified reflection region 1630-4 is an approximation of a reflection on the display 108 visible to the user 102. To generate the fourth modified reflection region 1630-4, the device 104 may invert the fourth reflection region 1628-4 along an axis and scale the fourth reflection region 1628-4 to a size of the display 108. Alternatively, the device 104 may determine a reflection vector for each display pixel, as discussed above, and determine an individual pixel in the second section 1626-2 corresponding to the reflection vector. Thus, no inversion or scaling is involved as each display pixel is individually mapped to a pixel in the second section 1626-2. The device 104 may use the fourth modified reflection region 1630-4 to determine display pixels on the display 108 affected by light source(s) included in the fourth reflection region 1628-4, as discussed in greater detail below.

In some embodiments, the head vector 112 may be a unit vector and may lack distance information. An assumption used in environment mapping is that the environment may be infinitely far away from the device 104 or that the device 104 is infinitely small. Therefore, if the user 102 is at a great distance from the device 104, the environment map may be used without distance information. However, in typical situations the user 102 is relatively close to the device 104 and distance information is beneficial for accurate glare compensation. Thus, the device 104 may approximate a distance between the user 102 and the device 104 using any method known to one of skill in the art, including the use of a proximity sensor on the face of the device 104, or other techniques.

Referring back to FIG. 15, the reflection region 1528 may change based on a position of the user 102 relative to the device 104 and/or a location and/or rotation of the device 104. As discussed above, the position of the user 102 relative to the device 104 may change the head vector 112 and the corresponding reflection vector 22. Therefore, a size and/or position of the reflection region 1528 may change based on the position of the user 102 relative to the device 104. Further, the location and/or rotation of the device 104 may change image information included in the reflection region 1528 or may shift the reflection region 1528 within the cubemap 1526. In a first embodiment, an orientation of the device 104 is fixed within the cubemap 1526 and the device 104 may modify and/or shift image information in the cubemap 1526 as the device 104 rotates and/or moves. Therefore, the reflection region 1528 may be stationary within the cubemap 1526 (assuming the position of the user 102 relative to the device 104 is fixed) but the image information included in the reflection region 1528 may vary based on the location and/or rotation of the device 104.

In a second embodiment, the cubemap 1526 may be fixed and an orientation of the device 104 may change within the cubemap 1526. An example of the cubemap 1526 being fixed is if the device 104 uses a stitched image based on a calibration step and/or combining image information to reduce a number of image data captures. The cubemap 1526 may be recalculated from the stitched image based on a location of the device 104, but an orientation of the device 104 within the cubemap may be variable. As the cubemap 1526 is fixed, the device 104 does not modify or shift image information. Instead, the device 104 may change the orientation of the device 104 within the cubemap 1526 so that the normal vector $\hat{N}$ points in the direction the device 104 is facing. Therefore, the reflection region 1528 may move within the cubemap 1526 based on the normal vector $\hat{N}$, even if the position of the user 102 relative to the device 104 is fixed.

Figure 17:
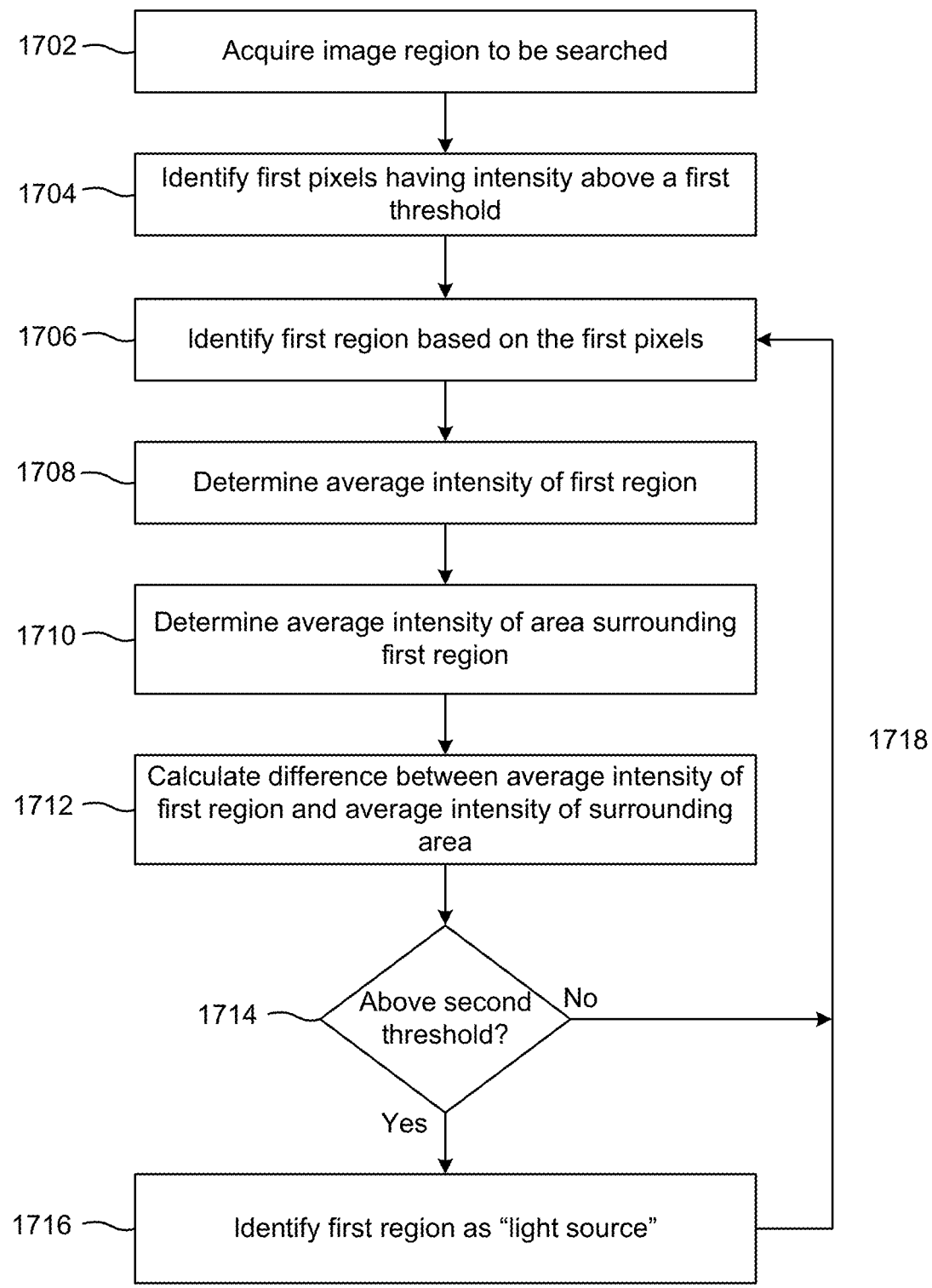
FIG. 17 is an example of a method for identifying a light source in an image in accordance with various embodiments.

FIG. 17 is an example of a method for identifying a light source in an image in accordance with various embodiments. In a first embodiment, the device 104 may acquire a reflection region and may identify light source(s) within the reflection region. For example, if the device 104 frequently generates new cubemaps, the device 104 may determine the reflection region before identifying light source(s) to limit a search area and reduce an amount of processing required. In a second embodiment, the device 104 may acquire the reflection region and may identify light source(s) within a larger area including the reflection region. For example, the device 104 may select the larger area to allow for the reflection region to shift based on minor rotations of the device 104 and/or changes to the reflection vector 22. In a third embodiment, the device 104 may acquire a cubemap and may identify light source(s) within the cubemap. For example, if the device 104 reuses the cubemap, identifying light source(s) within the entire cubemap may reduce a latency as the reflection region moves amongst the cubemap. In a fourth embodiment, the device 104 may acquire image data representing an image (such as a captured image or a stitched image) and may identify light source(s) within the image prior to generating a cubemap. For example, if the device 104 generates more than one cubemap based on a stitched image, identifying light source(s) within the stitched image may reduce a latency as additional cubemaps are generated and/or reflection regions move within the cubemap.

Various combinations of the above described embodiments may be used without departing from the disclosure. For example, the device 104 may determine that the device 104 is in motion and/or the surrounding area is rapidly changing and use the first embodiment or second embodiment to reduce an amount of processing. Similarly, the device 104 may determine that the device 104 is stationary and/or the surrounding area is static and may use the third embodiment or the fourth embodiment to reduce a latency associated with the processing.

As illustrated in FIG. 17, the device 104 may acquire (1702), for example using camera(s) 106, image data representing an image region to be searched. The image region may include image data representing a captured image, image data representing a stitched image or image data representing a portion of the captured image or the stitched image, such as the reflection region or the larger area including the reflection region. The device 104 may identify (1704) first pixels within the image region having an intensity above a first threshold.

The device 104 may identify (1706) a first region based on the first pixels. For example, the device 104 may identify first pixels having an intensity above the first threshold and group the first pixels into region(s), including the first region. In a first example, the device 104 may group the first pixels based on the first pixels being contiguous, such as selecting first pixels connected in series as the first region. The first example may be used for localized light sources such as headlights, direct sunlight, spotlights, unshaded light bulbs, etc. that cause bright areas of glare. In a second example, the device 104 may group the first pixels based on proximity, such as identifying first pixels in proximity to each other and selecting an area including the first pixels and non-first pixels in between the first pixels. The second example may be used for light source(s) having a grid pattern or other object blocking a portion of the light source(s), creating non-first pixels interspersed between the first pixels. Using the first example, the device 104 may split a single light source into multiple light sources based on the interrupting non-first pixels, whereas the second example may group the first pixels and the non-first pixels together as a single light source. In a third example, the device 104 may identify the first region by identifying a shape, such as identifying a perimeter of the shape using first pixels and selecting first pixels and non-first pixels within the perimeter of the shape as the first region. The third example may be used similarly to the second example for clearly outlined light source(s).

The device 104 may determine (1708) an average intensity of the first region and may determine (1710) an average intensity of an area surrounding the first region. The area surrounding the first region may include the entire image region or may be localized around the first region. The device 104 may calculate (1712) a difference between the average intensity of the first region and the average intensity of the surrounding area. The device 104 may determine (1714) if the difference is above a second threshold. If the difference is above the second threshold, the device 104 may identify (1716) the first region as a light source. The device 104 may then loop (1718) back to step 1706 and repeat steps 1706-1718 to identify another first region. If the difference is not above the second threshold, the device 104 may loop (1718) to step 1706 and repeat steps 1706-1718 to identify another first region.

Figure 18A:
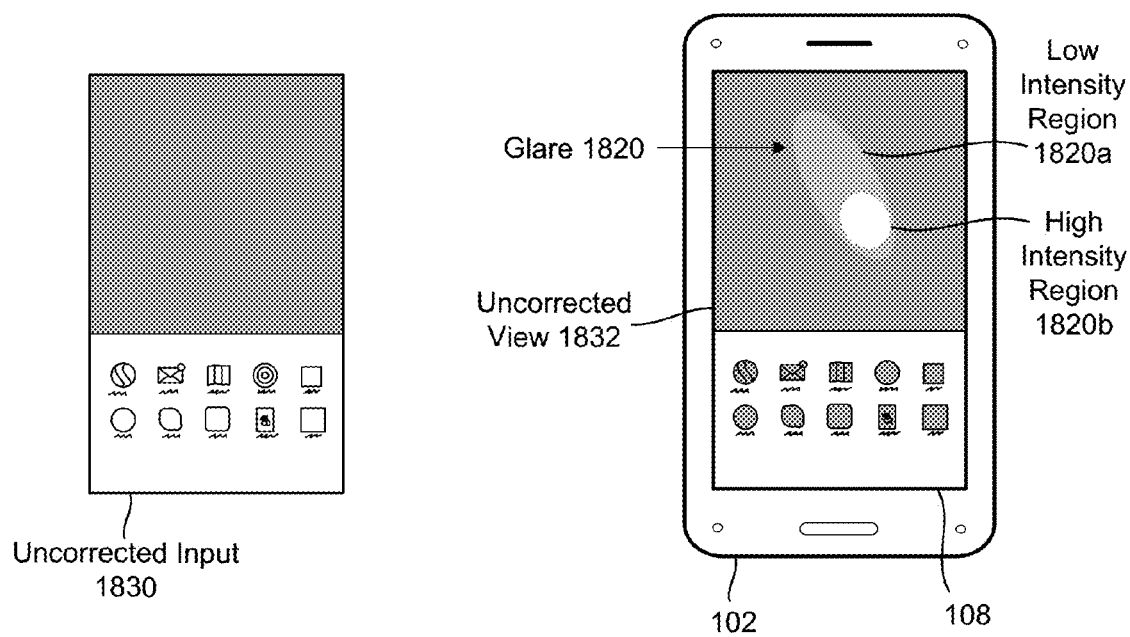
FIGS. 18A-18D illustrate examples of an uncorrected input being affected by glare and a corrected input not being affected by glare in accordance with various embodiments.
Figure 18B:
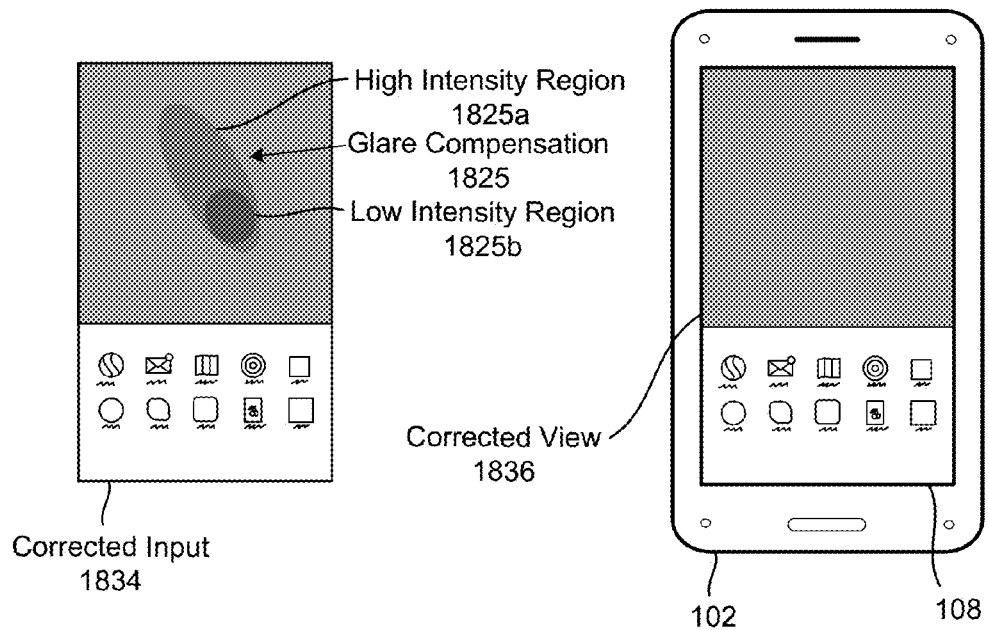

FIGS. 18A-18B illustrate examples of an uncorrected input 1830 being affected by glare 1820 and a corrected input 1834 not being affected by the glare 1820 in accordance with various embodiments. FIG. 18A illustrates an uncorrected input 1830 generated by the device 104, such as the contents of the display to be rendered. If a light source is reflected by the display 108, the uncorrected view 1832 would include the uncorrected input 1830 along with glare 1820 that is visible to the user 102 at a reflection location on the display 108. As illustrated in FIG. 18A, the glare 1820 may include a low intensity region 1820a and a high intensity region 1820b. An intensity of the glare 1820 may be additive to an intensity of display pixels within the uncorrected input 1830 that are affected by the glare 1820 and these display pixels may be washed out or difficult for the user 102 to see. In contrast, FIG. 18B illustrates a corrected input 1834 generated by the device 104 that includes glare compensation 1825. As illustrated in FIG. 18B, the glare compensation 1825 may include a high intensity region 1825a and a low intensity region 1825b, opposite the glare 1820, to compensate for the intensity of the low intensity region 1820a and the high intensity region 1820b, respectively. If the light source is reflected by the display 108, the user 102 may not perceive the glare 140 in the corrected view 1836 at the reflection location on the display 108. Instead, an intensity of display pixels within the glare compensation 1825 is dimmed (e.g., brightness reduced) based on an intensity of image pixels associated with the glare 1820. Therefore, while the intensity of the glare 1820 may be additive to the intensity of display pixels within the glare compensation 1825, the combined intensity of the display pixels is similar to an intensity of display pixels outside the glare compensation 1825 and the corrected view 1836 is visible to the user 102 with only minor variations in intensity.

A brightness of the display 108 limits an amount that the brightness of the display 108 can be reduced. For example, if an intensity of a display pixel is a first amount, the intensity of the display pixel can be reduced by a second amount up to but not exceeding the first amount. Therefore, if an intensity of the glare 1820 exceeds the brightness of the display 108, the glare compensation 1825 cannot negate the glare 1820 entirely. Instead, the glare compensation 1825 may negate a portion of the glare 1820 and the user 102 may perceive a reduced glare at the reflection location.

In some situations, an intensity of the glare 1820 may be strong enough to wash out the display 108 even with the brightness of the display 108 reduced entirely (e.g., turned off). In these situations, the device 104 may reduce the brightness of portions of the display 108 entirely to turn off or otherwise ignore the display pixels within the portions of the display 108 affected by the glare 1820. The device 104 may identify display pixels turned off and may re-render reflowable content so that the reflowable content flows around the identified display pixels that are turned off. Therefore, the identified display pixels are not used to display the reflowable content but the reflowable content may still be displayed by remaining display pixels of the display 108 that aren't as affected by the glare 1820. The device 104 may avoid these display pixels by generating a bounding box or other object and inserting the bounding box into the reflowable content's layout based on a location of the identified display pixels. For example, if the device 104 is rendering an electronic book and determines that display pixels in a center of the display 108 are affected by the glare 1820 and an intensity of the glare 1820 exceeds an intensity of the center display pixels, the device 104 may reflow the electronic book so that text of the book is not displayed by the center display pixels. Instead, the text is rendered using the remaining display pixels and may skip the center display pixels affected by the glare 1820. Thus, the device may avoid using portions of the display that are affected by uncorrectable glare. While FIGS. 18A-18B illustrate the glare 1820 and the glare compensation 1825 having two intensity regions, the disclosure is not limited thereto and may vary. For example, the device 104 may determine that the glare 1820 has a plurality of different intensities and the glare compensation 1825 may include a plurality of different intensity levels to compensate for the glare 1820. Alternatively, the device 104 may group similar intensities and may approximate the glare 1820 using any methods known to one of skill in the art to reduce a complexity of determining the glare compensation 1825.

In some embodiments, the device 104 may determine display pixels within the glare compensation 1825 based on a plurality of head vectors and corresponding reflection vectors. For example, the device 104 may calculate a head vector and corresponding reflection vector for a plurality of display pixels. Based on the reflection vectors, the device 104 may associate each display pixel with a unique image pixel in the cubemap. Alternatively, the device 104 may group display pixels and may determine a shared head vector and corresponding reflection vector for the group of display pixels. The device 104 may determine an intensity with which to dim each display pixel as described in greater detail below.

In other embodiments, the device 104 may determine display pixels within the glare compensation 1825 based on a modified reflection region. For example, as illustrated in FIG. 16, the device 104 may generate a first modified reflection region 1630-1 based on a first reflection region 1628-1. To generate the first modified reflection region 1630-1, the device 104 may invert the first reflection region 1628-1 along an axis and scale the first reflection region 1628-1 to a size of the display 108. The device 104 may use the first modified reflection region 1630-1 to determine display pixels on the display 108 affected by light source(s) included in the reflection region 1628-1. For example, the device 104 may identify a location of light source(s) in the modified reflection region 1630-1 as described in greater detail above with regard to FIG. 17. The device 104 may identify first image pixels associated with the light source(s) in the modified reflection region 1630-1 and may determine first display pixels corresponding to the first image pixels. The first display pixels may make up the glare compensation 1825, and the device 104 may determine an intensity with which to dim the first display pixels as described below.

To calculate an intensity with which to dim an individual display pixel, the device 104 may first determine a glare intensity based on image pixels associated with the individual display pixel. If an individual display pixel corresponds to an individual image pixel, the device 104 may determine the glare intensity based on an intensity of the individual image pixel, as a first example. As a second example, the device 104 may determine the glare intensity based on an interpolation of image pixels within a determined range (e.g. 2 pixels, 10 pixels, etc.) of the individual image pixel. As a third example, the device 104 may determine the glare intensity based on an average intensity of image pixels surrounding the individual image pixel. If a group of display pixels correspond to an individual image pixel based on a shared reflection vector, the device 104 may determine the glare intensity for the entire group of display pixels using the first example, the second example or the third example described above. Alternatively, the device 104 may determine the glare intensity for display pixels in the group of display pixels based on corresponding image pixels using the first example, the second example or the third example described above, the corresponding image pixels determined using a relationship between each display pixel and a center of the group of display pixels. However, based on an index of refraction associated with the device 104, not all of the glare intensity is reflected to the user 102. Therefore, after determining the glare intensity for an individual display pixel, the device 104 may multiply the glare intensity by the index of refraction to determine the corrected glare intensity. Finally, the device 104 may subtract the corrected glare intensity from an intensity of the individual display pixel to generate the corrected input 1834.

The glare compensation 1825 may be based on a location of the glare 1820 as viewed from a dominant eye of the user 102. Therefore, while the glare compensation 1825 may remove the glare 1820 in the dominant eye of the user 102, the non-dominant eye of the user 102 may perceive the glare compensation 1825 and potentially the glare 1820. For example, due to the distance between the dominant eye and the non-dominant eye, a first location of the glare 1820 in the dominant eye may be different than a second location of the glare 1820 in the non-dominant eye. Effectively, the glare 1820 may be visible to the user 102 in both the first location and the second location. However, the glare compensation 1825 originates in the display 108 and is therefore visible in the first location for both the dominant eye and the non-dominant eye. When viewed by the dominant eye of the user 102, the glare compensation 1825 offsets the glare 1820 in the first location and the dominant eye sees the corrected view 1836. When viewed by the non-dominant eye of the user 102, the glare compensation 1825 is in the first location and the glare 1820 is in the second location, so the non-dominant eye may see the glare compensation 1825 and potentially the glare 1820 (the glare 1820 may not be visible to the non-dominant eye). However, depending on how the user 102 combines the view from the dominant eye with the view from the non-dominant eye, the glare 1820 may be less visible based on the glare compensation 1825.

Figure 18C:
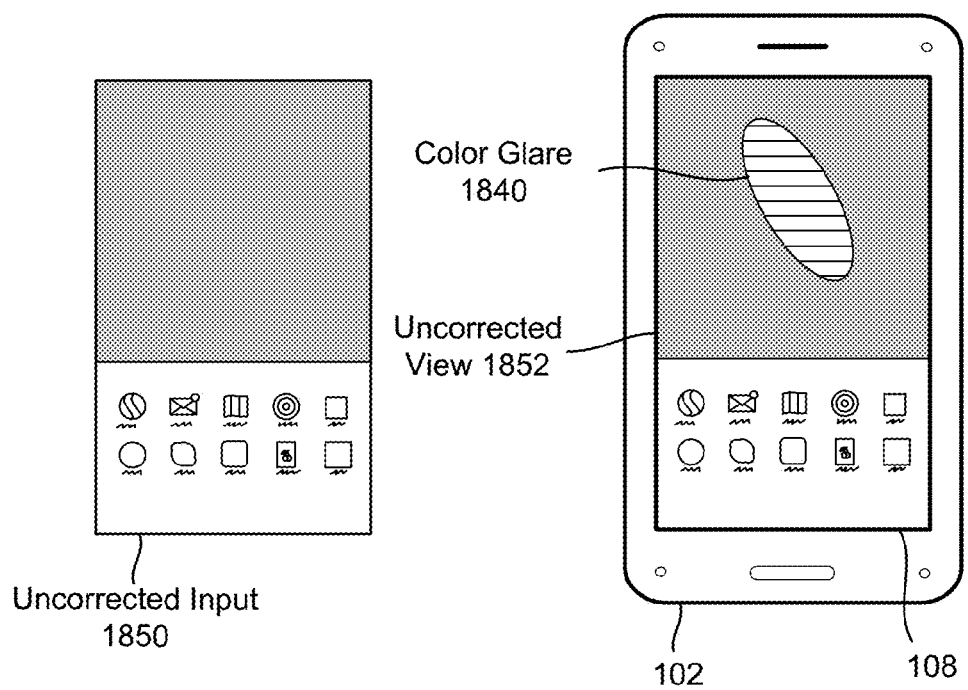
Figure 18D:
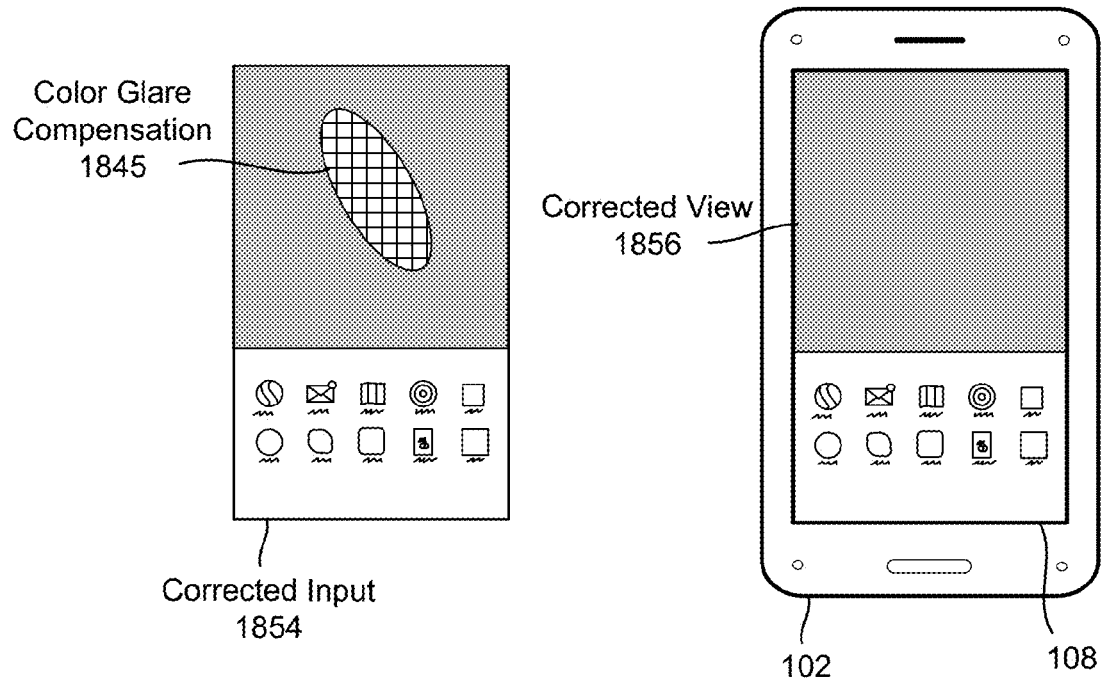

In addition to compensating for an intensity of glare, in some embodiments the device 104 may also compensate for color glare. FIGS. 18C-18D illustrate examples of an uncorrected input 1850 being affected by color glare 1840 and a corrected input 1854 not being affected by the color glare 1840 in accordance with various embodiments. FIG. 18C illustrates an uncorrected input 1850 generated by the device 104, such as the contents of the display to be rendered. If a light source is reflected by the display 108, the uncorrected view 1852 would include the uncorrected input 1850 along with color glare 1840 that is visible to the user 102. As illustrated in FIG. 18C, the color glare 1840 has a blue tint. An intensity and color of the color glare 1840 may be additive to an intensity and color of display pixels within the uncorrected input 1850 that are affected by the color glare 1840 and these display pixels may be washed out or difficult for the user 102 to see and may include the blue tint caused by the color glare 1840.

FIG. 18D illustrates a corrected input 1854 generated by the device 104 that includes color glare compensation 1845. In addition to dimming an intensity of pixels within color glare compensation 1845 by an intensity of image pixels associated with the color glare 1840, the device 104 may invert a first color of the color glare 1840 to determine a first inverted color for the color glare compensation 1845. The first inverted color is a negative of the first color, as known in image processing. For example, as illustrated in FIG. 18D, the color glare compensation 1845 has a yellow tint, opposite the blue tint of the color glare 1840, to compensate for the color glare 1840. If the light source is reflected by the display 108, the user 102 may not perceive the glare 1840 in the corrected view 1856. Instead, an intensity and color of display pixels within the glare compensation 1845 is dimmed based on the intensity and color of the image pixels associated with the color glare 1840. Therefore, while the intensity and color of the color glare 1840 may be additive to the intensity and color of display pixels within the color glare compensation 1845, the combined intensity and color of the display pixels is similar to an intensity and color of display pixels outside the color glare compensation 1845 and the corrected view 1856 is visible to the user 102 with only minor variations in intensity and/or color. The device 104 may determine display pixels within color glare compensation 1845 and a corresponding intensity with which to dim the display pixels as described above with regard to glare compensation 1825.

FIG. 19 illustrates a block diagram conceptually illustrating components of a system to perform the steps described herein. Depending upon how the system is structured, some of components shown in FIG. 19 as part of a device 104 may be included in one or more other devices. In operation, the system may include computer-readable and computer-executable instructions that reside in storage 1908 on the device 104. The device 104 may be a mobile device, such as a smart phone, tablet, smart watch, or the like. Alternatively, the device 104 may be a computing device, such as a laptop computer, a television device or incorporated into an automobile, such as a head-up display (HUD) device, without departing from the present disclosure.

The device 104 may include one or more controllers/processors 1904 comprising one-or-more central processing units (CPUs) for processing data and computer-readable instructions, and a memory 1906 for storing data and instructions. The memory 1906 may include volatile random access memory (RAM), non-volatile read only memory (ROM), non-volatile magnetoresistive (MRAM) and/or other types of memory. The device 104 may also include a data storage component 1908 for storing data and processor-executable instructions. The data storage component 1908 may include one or more non-volatile storage types such as magnetic storage, optical storage, solid-state storage, etc. The device 104 may also be connected to a removable or external non-volatile memory and/or storage (such as a removable memory card, memory key drive, networked storage, etc.) through the input/output device interfaces 1902.

Executable instructions for operating the device 104 and its various components may be executed by the controller(s)/processor(s) 1904, using the memory 1906 as temporary "working" storage at runtime. The executable instructions may be stored in a non-transitory manner in non-volatile memory 1906, storage 1908, or an external device. Alternatively, some or all of the executable instructions may be embedded in hardware or firmware in addition to or instead of software.

As shown in FIG. 19, the device 104 may include one or more of a variety of sensors. Among the sensors are an audio capture component such as microphone(s) 1950, an image and/or video capture component such as camera(s) 106, a touch interface 1914, an antenna 1922, positioning sensors 1962, field sensors 1964 (e.g., a 3-axis magnetometer, a gravity sensor), and motion sensors 1966 (e.g., a 3-axis accelerometer, a 3-axis gyroscope). The device 104 may also include one or more buttons (not shown). Several of each of these components may be included. Also, although shown as integrated within device 104, some or parts of the various sensors may be external to device 104 (such as AR glasses 104b, wireless headset 1321, etc.) and accessed through input/output device interfaces 1902 either wirelessly or through a physical connection.

The antenna 1922 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 1950 or array of microphones, a wired headset (not illustrated), a wireless headset (e.g., wireless headset 1321 in FIG. 13), etc. If an array of microphones is included, approximate distance to a sound's point of origin may be performed acoustic localization based on time and amplitude differences between sounds captured by different microphones of the array.

The touch interface 1914 may be integrated with a surface of a display 1912 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 1962 provides an interface for acquiring location information, such as information from a satellite geographic positioning system(s). For example, the positioning module 1962 may include a Global Positioning System (GPS) receiver and/or a Global Navigation Satellite System (GLONASS) receiver. The positioning module 1962 may also acquire location-based information using other radio sources (e.g., via antenna 1922), such as mapping services that triangulate off of known WiFi service set identifiers (SSIDs) or cellular towers within range of the device 104.

The field sensor module 1964 provides directional data. The field sensor module 1964 may include a 3-axis magnetometer that measures magnetic fields and may serve as a compass. The field sensor module 1964 may also include a dedicated gravity sensor to determine up-and-down.

The motion sensor module 1966 provides inertial data, and may include 3-axis accelerometer and a 3-axis gyroscope.

Examples of other sensors that may be configured on the device include an electronic thermometer to measure ambient temperature and a proximity sensor to detect whether there is an object within a certain distance of the device 104.

Sensors may be communicatively coupled with other components of system via input/output (I/O) device interfaces 1902 and/or via an address/data bus 1924. The address/data bus 1924 conveys data among components of the device 104. Each component within the device 104 may also be directly connected to other components in addition to (or instead of) being connected to other components across the bus 1924.

The I/O device interfaces 1902 may connect to a variety of components and networks. Among other things, the I/O device interfaces 1902 may include an interface for an external peripheral device connection such as universal serial bus (USB), FireWire, Thunderbolt or other connection protocol. The input/output device interfaces 1902 may also support a variety of networks via an Ethernet port and antenna 1922.

The device 104 may also include a video output component for displaying images, such as display 1912. The video output component may be a display of any suitable technology, such as a liquid crystal display, an organic light emitting diode display, electronic paper, an electrochromic display, a pico projector, etc. The video output component may be integrated into the device 104 or may be separate.

The device 104 may also include an audio output component such as a speaker 1918, a wired headset (not illustrated), or a wireless headset (e.g., wireless headset 1321). Other output devices include a haptic effect generator 1992. The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 1914, such as electroactive polymers, piezoelectrics, electrostatics, subsonic audio wave surface actuation, etc. The device may also include an LED 1994 or other light emitting component to provide other visual feedback to a user other than that provided through display 1912.

As discussed above, device 104 includes controller(s)/processors 1904, memory 1906, and storage 1908. In addition, the device 104 may include a user position module 1930 and a rendering engine 1954, each of which may comprise processor-executable instructions stored in storage 1908 to be executed by controller(s)/processor(s) 1904 (e.g., software, firmware), hardware, or some combination thereof. For example, components of the user position module 1930 or rendering engine 1954 may be part of a software application running in the foreground and/or background on the device 104. The rendering engine 1954 actually renders, as in generates the appearance of, a graphical user interface. The rendering engine 1954 may render UI elements based on the user position as determined by the user position module 1930. The user position module 1930 may utilize the camera(s) 106 (or other components) to estimate a head of the selected user relative to the device 104 as discussed above.

The device 104 may also include an environment mapping module 1940 and display correcting module 1942, each of which may comprise processor-executable instructions stored in storage 1908 to be executed by controller(s)/processor(s) 1904 (e.g., software, firmware), hardware, or some combination thereof. For example, components of the environment mapping module 1940 and/or the display correcting module 1942 may be part of a software application running in the foreground and/or background on the device 104. The environment mapping module 1940 may perform step 126 described above in reference to FIGS. 1, 12. 13 and 14. For example, the environment mapping module 1940 may generate an environment map of an area surrounding the device 104 as discussed in greater detail above. The display correcting module 1942 may perform steps 124, 128, 130, 132, 134 and 136 described above in reference to FIGS. 1, 10, 11, 15, 16, 17 and 18. For example, the display correcting module 1942 may calculate a reflection vector based on the head vector, identify a reflection region in the environment map, identify light sources in the reflection region, identify pixels on the display affected by the light sources, dim intensities of the identified display pixels based on intensities of the corresponding light sources and generate a corrected display, as discussed in greater detail above. However, the present disclosure is not limited thereto and each of the user position module 1930, the environment mapping module 1940 and the display correcting module 1942 may perform any of the processes and/or steps listed above without departing from the disclosure.

As noted above, depending upon how the system is structured, other components not shown in FIG. 19 may be included as part of the device 104 certain components shown in FIG. 19 as part of a device 104 may be included in one or more other devices.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    determining a first head vector describing at least a direction from a device to a location of a user's head relative to the device;
    determining a distance from the user's head to the device;
    determining a second head vector for a first display pixel of a plurality of display pixels, wherein the determining the second head vector is based on the first head vector, the distance and a location of the first display pixel within the plurality of display pixels of a display of the device;
    calculating, based on the second head vector, a reflection vector describing at least a direction from the device to an area reflected on the display;
    generating an environment map, the environment map representing a three-dimensional environment of the device;
    identifying a region in the environment map corresponding to a light source;
    determining, using the reflection vector and the environment map, that the first display pixel corresponds to a reflection location on the display, the reflection location corresponding to a reflection of the light source; and
    rendering a corrected user interface (UI) for the display, the corrected UI including a UI portion corresponding to the first display pixel, wherein the UI portion is displayed based at least in part on determining that the first display pixel corresponds to the reflection location.

2. The computer-implemented method of claim 1, further comprising:
    identifying a first color value associated with a selected pixel from the region; and
    inverting the first color value to generate a first inverted color value, the first inverted color value being a negative to the first color value, wherein the UI portion is displayed at the reduced brightness and includes the selected pixel displayed at the first inverted color value.

3. The computer-implemented method of claim 1, further comprising:
    determining a reflection pixel in the environment map corresponding to the first display pixel using the reflection vector;
    determining a first intensity of the reflection pixel; and
    reducing an intensity of the first display pixel by the first intensity.

4. The computer-implemented method of claim 3, further comprising:
    determining that the first intensity exceeds a threshold;
    reducing the intensity of the first display pixel to zero;
    rendering content to be displayed to avoid the first display pixel, the content to be displayed flowing around the first display pixel; and
    displaying the rendered content.

5. The computer-implemented method of claim 1, wherein:
    the determining the first head vector further comprises:
        acquiring a first image that includes the user's head;
        acquiring a second image that includes the user's head;
        detecting the user's head in the first image using facial detection;
        detecting the user's head in the second image using facial detection; and
        determining the first head vector based on the first image and the second image, and
    the determining the second head vector further comprises:
        determining the location of the first display pixel on the device;
        determining an offset from the location of the first display pixel to a location on the device associated with a first end of the first head vector; and
        generating the second head vector based at least in part on the first head vector, the offset and the distance.

6. The computer-implemented method of claim 1, wherein the calculating further comprises:
    determining a normal vector of the device;
    calculating a dot product between the normal vector and the second head vector;
    multiplying the dot product by twice the normal vector to generate a first vector; and
    subtracting the second head vector from the first vector to generate a second vector, wherein the second vector is the reflection vector.

7. The computer-implemented method of claim 1, wherein the generating the environment map further comprises:
    obtaining an image;
    generating a first cubemap from the image, the first cubemap including image data;
    detecting a rotation of the device; and
    modifying the image data within the first cubemap based on the rotation of the device to generate a second cubemap, wherein the second cubemap is the environment map.

8. The computer-implemented method of claim 1, wherein:
    the generating the environment map further comprises:
        obtaining an image; and
        generating, based on the image, a cubemap that surrounds a representation of the device, the cubemap being the environment map, and
    the determining that the first display pixel corresponds to the reflection location further comprises:
        determining a first point in the cubemap based on a first orientation of the device, wherein the reflection vector extends from the representation of the device to the first point;
        detecting movement of the device;
        determining a second orientation of the device based on the movement; and
        determining a second point in the cubemap based on the second orientation of the device, wherein the reflection vector extends from the representation of the device to the second point.

9. A system, comprising:
    one or more processors; and
    a memory including instructions operable to be executed by the one or more processors to perform a set of actions to configure the system to:
        determine a first head vector describing at least a direction from a device to a location of a user's head relative to the device;
        determine a distance from the user's head to the device;
        determine a second head vector for a first display pixel of a plurality of display pixels, wherein the determining the second head vector is based on the first head vector, the distance and a location of the first display pixel within the plurality of display pixels of a display of the device;
        calculate, based on the second head vector, a reflection vector describing at least a direction from the device to an area reflected on the display;
        generate an environment map, the environment map representing a three-dimensional environment of the device;
        identify a region in the environment map corresponding to a light source;
        determine, using the reflection vector and the environment map, that the first display pixel corresponds to a reflection location on the display, the reflection location corresponding to a reflection of the light source; and
        render a corrected user interface (UI) for the display, the corrected UI including a UI portion corresponding to the first display pixel, wherein the UI portion is displayed based at least in part on determining that the first display pixel corresponds to the reflection location.

10. The system of claim 9, wherein the instructions further configure the system to:
    identify a first color value associated with a selected pixel from the region; and
    invert the first color value to generate a first inverted color value, the first inverted color value being a negative of the first color value, wherein the UI portion is displayed at the reduced brightness and includes the selected pixel displayed at the first inverted color value.

11. The system of claim 9, wherein the instructions further configure the system to:
    determine a reflection pixel in the environment map corresponding to the first display pixel using the reflection vector;
    determine a first intensity of the reflection pixel; and
    reduce an intensity of the first display pixel by the first intensity.

12. The system of claim 11, wherein the instructions further configure the system to:
    determine that the first intensity exceeds a threshold;
    reduce the intensity of the first display pixel to zero;
    render content to be displayed to avoid the first display pixel, the content to be displayed flowing around the first display pixel; and
    display the rendered content.

13. The system of claim 9, wherein the instructions further configure the system to:
    acquire a first image that includes the user's head;
    acquire a second image that includes the user's head;
    detect the user's head in the first image using facial detection;

detect the user's head in the second image using facial detection;
determine the first head vector based on the first image and the second image determine the location of the first display pixel on the device;
determine an offset from the location of the first display pixel to a location on the device associated with the first head vector; and
generate the second head vector based at least in part on the first head vector, the offset and the distance.

14. The system of claim 9, wherein the instructions further configure the system to:
determine a normal vector of the device;
calculate a dot product between the normal vector and the second head vector;
multiply the dot product by twice the normal vector to generate a first vector; and
subtract the second head vector from the first vector to generate a second vector, wherein the second vector is the reflection vector.

15. The system of claim 9, wherein the instructions further configure the system to:
obtain an image;
generate a first cubemap from the image, the first cubemap including image data;
detect a rotation of the device; and
modify the image data within the first cubemap based on the rotation of the device to generate a second cubemap, wherein the second cubemap is the environment map.

16. The system of claim 9, wherein the instructions further configure the system to:
obtain an image;
generate, based on the image, a cubemap that surrounds a representation of the device, the cubemap being the environment map;
determine a first point in the cubemap based on a first orientation of the device, wherein the reflection vector extends from the representation of the device to the first point;
detect movement of the device;
determine a second orientation of the device based on the movement; and
determine a second point in the cubemap based on the second orientation of the device, wherein the reflection vector extends from the representation of the device to the second point.

17. The computer-implemented method of claim 1, wherein the generating the environment map further comprises:
receiving image data corresponding to the environment of the device;
generating, based on a first portion of the image data, a first side of the environment map; and
generating, based on a second portion of the image data, a second side of the environment map, the second side orthogonal to the first side in at least one dimension.

18. The computer-implemented method of claim 1, wherein the generating the environment map further comprises:
receiving image data corresponding to the environment of the device;
determining an orientation of the device; and
generating, based on the image data and the orientation of the device, the environment map such that at least a portion of the image data surrounds a representation of the device.

19. The computer-implemented method of claim 1, further comprising:
determining, at a second time, a second distance from the user's head to the device;
determining a third head vector for the first display pixel, wherein the determining the third head vector is based on the first head vector, the second distance and the location of the first display pixel within the plurality of display pixels; and
calculating, based on the third head vector, a second reflection vector describing at least a direction from the device to a second area reflected on the display, wherein a size of the second area relative to a size of the first area corresponds to a difference between the distance and the second distance.

20. The computer-implemented method of claim 1, further comprising:
determining, at a second time, a second distance from the user's head to the device;
determining, based at least in part on the second distance, a third head vector for the first display pixel; and
calculating, based on the third head vector, a second reflection vector describing at least a direction from the device to a second area reflected on the display,
wherein:
the area corresponds to a first portion of the environment map,
the second area corresponds to a second portion of the environment map,
the second distance is smaller than the distance, and
the second portion is larger than the first portion.

* * * * *